United States Patent
Sasa

(10) Patent No.: US 8,009,534 B2
(45) Date of Patent: Aug. 30, 2011

(54) METHOD OF RECORDING DATA IN MULTILAYERED RECORDABLE OPTICAL RECORDING MEDIUM, RECORDING AND REPRODUCING APPARATUS FOR RECORDING THE DATA IN THE RECORDING MEDIUM AND THE RECORDING MEDIUM

(75) Inventor: Noboru Sasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 12/209,865

(22) Filed: Sep. 12, 2008

(65) Prior Publication Data

US 2009/0073844 A1 Mar. 19, 2009

(30) Foreign Application Priority Data

Sep. 14, 2007 (JP) .................. 2007-240242

(51) Int. Cl.
*G11B 7/00* (2006.01)
(52) U.S. Cl. ...................... 369/47.53; 369/94
(58) Field of Classification Search ............. 369/47.53
See application file for complete search history.

(56) References Cited

U.S. PATENT DOCUMENTS

| | | | |
|---|---|---|---|
| 5,939,163 A | 8/1999 | Ueno et al. | |
| 5,998,093 A | 12/1999 | Tomura et al. | |
| 6,057,020 A | 5/2000 | Ueno et al. | |
| 6,197,477 B1 | 3/2001 | Satoh et al. | |
| 6,225,022 B1 | 5/2001 | Tomura et al. | |
| 6,558,768 B2 | 5/2003 | Noguchi et al. | |
| 6,628,595 B1 | 9/2003 | Sasa et al. | |
| 6,741,547 B2 | 5/2004 | Tomura et al. | |
| 6,762,008 B2 | 7/2004 | Satoh et al. | |
| 6,933,032 B2 | 8/2005 | Sasa et al. | |
| 7,061,847 B2 | 6/2006 | Sasa et al. | |
| 7,085,429 B2 | 8/2006 | Sasa | |
| 7,413,788 B2 | 8/2008 | Sasa et al. | |
| 2005/0226133 A1 | 10/2005 | Ueki | |
| 2006/0153055 A1 | 7/2006 | Suh | |
| 2006/0222810 A1 | 10/2006 | Hayashi et al. | |
| 2006/0285457 A1 | 12/2006 | Muramatsu et al. | |
| 2007/0037095 A1 | 2/2007 | Sasa | |
| 2007/0104057 A1* | 5/2007 | Martens et al. ............ | 369/47.53 |
| 2007/0114129 A1 | 5/2007 | Hayashi et al. | |
| 2007/0237064 A1 | 10/2007 | Fujii et al. | |
| 2008/0062841 A1 | 3/2008 | Sasa et al. | |
| 2008/0291798 A1* | 11/2008 | Takeshita et al. ......... | 369/47.53 |

FOREIGN PATENT DOCUMENTS

| | | |
|---|---|---|
| EP | 1 672 621 A1 | 6/2006 |
| JP | 03-157816 | 7/1991 |
| JP | 10-269575 | 10/1998 |
| JP | 2000-036130 | 2/2000 |
| JP | 2000-285469 | 10/2000 |

(Continued)

*Primary Examiner* — Adam R Giesy
(74) *Attorney, Agent, or Firm* — Dickstein Shapiro LLP

(57) ABSTRACT

A method of recording data in a multilayered recordable optical recording medium is disclosed. When test recording is executed in a multilayered recordable optical recording medium having N recording layers (N is an integer of 2 or more), a test recording range in a test recording area of an $(m+1)^{th}$ recording layer is shifted relative to a test recording range in a test recording area of an $m^{th}$ recording layer by an amount greater than a difference of decentration amounts between the $m^{th}$ and the $(m+1)^{th}$ recording layers or a maximum decentration amount in the N recording layers. The shifting direction is inverse to a test recording range adding direction in a radius direction of the recording medium.

18 Claims, 33 Drawing Sheets

FOREIGN PATENT DOCUMENTS

| | | |
|---|---|---|
| JP | 2000-293947 | 10/2000 |
| JP | 2003-022532 | 1/2003 |
| JP | 2004-171740 | 6/2004 |
| WO | WO 2004/112007 A1 | 12/2004 |
| WO | WO 2004/114289 A1 | 12/2004 |
| WO | WO2005/031718 A1 | 4/2005 |
| WO | WO 2005/104098 A1 | 11/2005 |
| WO | WO 2006/004089 A1 | 1/2006 |

\* cited by examiner

METHOD OF RECORDING DATA IN MULTILAYERED RECORDABLE OPTICAL RECORDING MEDIUM, RECORDING AND REPRODUCING APPARATUS FOR RECORDING THE DATA IN THE RECORDING MEDIUM AND THE RECORDING MEDIUM

BACKGROUND OF THE INVENTION

1. Field of the Invention

The present invention generally relates to a method of recording data in a multilayered recordable optical recording medium, a recording and reproducing apparatus for recording the data in the recording medium, and the recording medium.

2. Description of the Related Art

Recently, individual users have handled audio data, image data, and video data whose capacity is large. Meanwhile, a large capacity HD (hard disk) has been developed; however, the recording capacity is not sufficient, and even recording media such as a CD (compact disk), a DVD (digital versatile disk), and a medium using a blue laser have not had sufficient capacity.

In order to increase the recording capacity, a multilayered optical recording medium has been developed. The multilayered optical recording medium is formed by stacking plural layers on a substrate.

In a recording apparatus using the multilayered optical recording medium, a suitable pulse width, a suitable pulse strength, a suitable pulse shape, a suitable recording strategy, and so on are determined by test recording, and information (data) is recorded in the recording medium after the test recording.

When information is recorded in an optical recording medium, a process called calibration is generally executed in which calibration test recording is executed before actual recording, signal quality at a part where the test recording is applied is investigated, and an optimum value of laser beam intensity to be used is obtained. In recordable optical media such as a CD type medium and a DVD type medium, an area where the test recording is applied is at a most internal area of the disk, and the area is called a PCA (power calibration area). The above process is called OPC (optimum power control). In the present invention, instead of using the PCA, a test recording area is used.

As for the test recording, an existing β method and an existing γ method can be used.

When information is recorded in the multilayered optical recording medium, a laser beam reaches recording layers other than a nearest recording layer via the nearest recording layer, translucent reflection layers, adhesive films, intermediate films, and so on, viewed from a laser beam irradiating side.

FIG. 29 is a schematic diagram showing a status difference among second recording layers when information is recorded in a first recording layer. In FIG. 29, the second recording layer is the nearest recording layer to a laser beam, and the information is desired to be recorded in a first recording layer. In addition, in FIG. 29, a part where horizontal lines exist is an information recorded part.

In FIG. 29 (a), no information has been recorded in the second recording layer. In FIG. 29 (b), information has been recorded in all parts of the second recording layer where a laser beam is being irradiated. In FIGS. 29 (c) and (d), information has been recorded in a part of the second recording layer where a laser beam is being irradiated. In FIG. 29 (e), information has not been recorded in a part of the second recording layer where a laser beam is being irradiated. In FIG. 29 (f), information has been recorded in a part of the second recording layer where a laser beam is being irradiated.

When information is recorded in the first recording layer, the transmission rate of the laser beam to the first recording layer is changed depending on whether information has been recorded in the second recording layer.

For example, in FIG. 29, depending on the information recorded statuses in the second recording layer, the transmission rate of the laser beam to the first recording layer is greatly changed. That is, suitable recording conditions, for example, sensitivity of the laser beam on the first recording layer, are different among the information recorded statuses in the second recording layer.

In order to solve the above problem, Patent Document 1 discloses a multilayered optical disk having stacked plural recording layers. In the multilayered optical disk, a laser beam is irradiated from a specified surface and information is recorded in the plural recording layers and the recorded information is reproduced from the plural recording layers. In the disk, information is recorded in the recording layers starting at a recording layer nearest to the laser beam in order.

The recording layer is divided into plural zones in the diameter direction and the circumferential direction of the disk, flags showing the information recorded statuses (information recorded status flags) of the corresponding plural zones are recorded in a predetermined area, and a power value of the laser beam is controlled based on detection of the flag.

However, when information is sequentially recorded in the plural layers starting at the recording nearest the laser beam irradiating side in order, all the recording layers to which the laser beam is transmitted must provide the corresponding information recorded status flags. In addition, when the power value of the laser beam is determined at the time of recording and reproducing information, all of the information recorded status flags must be considered. That is, very complicated information management is required and detailed power control is required.

Especially, when the number of the recording layers is increased, the number of the information recorded status flags to be managed is increased; therefore, Patent Document 1 may not be effectively used in a multilayered optical recording medium in which the number of the recording layers is three or more.

In addition, as shown in FIGS. 29 (e) and (f), even if the information has been recorded in the second recording layer, an information unrecorded part may exist in the second recording layer due to, for example, defects.

In addition, the transmission rate of the laser beam is obviously different between the statuses shown in FIGS. 29 (b) and (e); however, the statuses may be handled as the same statuses. Consequently, suitable information recording in the first recording layer may not be executable.

In a case where information is recorded in the first recording layer through the second recording layer, only when defective recording does not exist in the second recording layer, the information can be recorded in the first recording layer. The defective recording is generated when the transmission rate is changed or dispersed.

Further, in Patent Document 1, as the recorded status flag, there are only two types of flags in the second recording layer positioned in front of the first recording layer where information is to be recorded. One of the flags shows that no information has been recorded in the second recording layer, and the other of the flags shows that a certifying process has been applied to the second recording layer or information has been fully recorded in the second recording layer. Consequently, optimum recording power or optimum reproducing power is not determined to the first recording layer.

That is, even if it is said that information has been recorded in a recording layer, the recorded status in the recording layer always has fluctuations depending on the position of the recording layer in the disk due to unevenness thickness of the recording layer, dispersion, tilt, decentration (not being concentric) of the recording layers in the disk, or a defect on the substrate of the disk or the recording layer.

That is, due to the fluctuations of the recorded status of the recording layer, the transmission rate of the laser beam fluctuates in a recording layer where the information is to be recorded, and the suitable recording conditions are changed in the recording layer where the information is to be recorded via a recording layer where information has been recorded. Consequently, the recording conditions in the recording layer where the information is to be recorded may not be optimum by using only the recorded status of the recording layer where the information has been recorded positioned in front of the recording layer where the information is to be recorded.

FIG. 30 is a schematic diagram showing zones when a recording area of a recording layer is divided into plural zones.

In Patent Document 1, as shown in FIG. 30, the recorded statuses of the first and second recording layers are managed in zones divided by the same corresponding distances from the center of the disk in the radius direction. In addition, in order to make the management of the recorded statuses easy, the width of the zone is greater than the diameter of the laser beam on the second recording layer, and the number of the flags to be managed is decreased.

For example, in a case where the width of each zone is determined as shown in FIG. 30, when information is recorded in a zone B1 of the first recording layer and a laser beam "in" is irradiated at an inner circumferential end of the zone B1 and a laser beam "out" is irradiated at an outer circumferential end of the zone B1, the zones of the second recording layer on which zones the recorded statuses are to be managed can be limited to three zones A2, B2, and C2.

However, in the zones A2, B2, and C2, having no dispersion of recording quality and no unrecorded part are not assured. Therefore, when the zone is made to be wider, the reliability of the suitable recording conditions in the first recording layer is lowered.

In order to make the reliability of the suitable recording conditions in the first recording layer high, the width of the zone is narrowed; however, the number of the zones to be managed is increased and this is not practical.

Patent Document 2 discloses an information recording method in an optical information recording medium. The medium provides two or more information recording layers, and a recording power test area for checking recording power is provided at an area other than an information recording area (user data recording area). When the number of the information recording layers is "n", the number of the recording power test areas is "n−1" or more, and one recording power test area is allocated to each information recording layer. Then information is recorded in an optical information recording medium by a laser beam by determining whether the medium has one of three statuses of a lowest transmission rate of the laser beam, a highest transmission rate of the laser beam, and both of the transmission rates of the laser beam. That is, the power test is applied to the above three statuses, the recording power is determined, and information is recorded in the information recording area based on the determined recording power.

However, when the number of the layers is increased, the number of combinations of the recorded statuses of the layers is increased, and the capacity of the power test areas may not be sufficient.

That is, the combinations of the recorded statuses must be obtained in the recording layers positioned in front of a recording layer where the power test is to be applied. In order to obtain high reliability of the power test, a width having a certain size or more is required in the front-positioned recording layers in the radius direction; however, since a sufficient width cannot be obtained, sufficient capacity of the power test area cannot be obtained.

When a sufficient width of the power test area cannot be obtained in the radius direction in the combinations of the recorded statuses of the front-positioned recording layers, the reliability of the power test is greatly lowered.

When the combinations of the recorded statuses of the recording layers are in a circumferential direction of the recording medium, a scheme for separating the combinations of the recorded statuses may be required. That is, the information of the scheme must be in a pre-pit and a wobble of the recording medium.

FIG. 31 is a schematic diagram in which combinations of recorded statuses of (K+1) and (K+2) layers are in a circumferential direction of a recording medium when information is recorded in a K layer behind the (K+1) and (K+2) layers.

As shown in FIG. 31, when combinations of recorded statuses of the (K+1) layer and the (K+2) layer are recorded in divided areas A through H in the circumferential direction of the recording medium and suitable recording conditions in the K layer are obtained in the divided areas A through H in test recording of the K layer, information can be recorded in the K layer with the suitable recording conditions based on the recorded statuses of the layers (K+1) and (K+2).

However, when the recorded statuses of the (K+1) and (K+2) layers are not ideal, the suitable recording conditions with high reliability cannot be obtained in the K layer. In the ideal status, the recorded statuses do not have an unrecorded area with a defect, and the recorded area does not have fluctuations and/or dispersions of the transmission rate of a laser beam.

FIG. 32 is a schematic diagram showing a difference between recorded statuses in the (K+1) layer when information is being recorded in the K layer. In FIG. 32 ($a$), a laser beam is transmitted through a recorded area of the (K+1) layer, and in FIG. 32 ($b$), a part of the laser beam is transmitted through the recorded area of the (K+1) layer.

The suitable recording conditions in the K layer are different between statuses shown in FIGS. 32 ($a$) and ($b$); however, Patent Document 2 does not teach how to handle the difference.

Patent Document 3 discloses an optical information recording medium. The medium provides two of a first through $N^{th}$ recording layers (N is an integer of 2 or more) disposed in order from both of the laser beam irradiating side and the laser beam irradiating opposite direction. When a laser beam is irradiated on any one of the first through $N^{th}$ recording layers from one of the directions, information is recorded in a recording layer or is reproduced from a recorded recording layer. At least any one of the first through $N^{th}$ recording layers provides a correction information recording section. Correction information for correcting intensity of the laser beam is recorded in the correction information recording section based on changes of transmission rates of the laser beam between an unrecorded status and a recorded status in the second through $n^{th}$ recording layers.

Each of the first through $N^{th}$ recording layers provides a test recording area for executing test recording and an information recording area for recording user data. The test recording area of a $K^{th}$ recording layer (K is an integer satisfying "$1 \leq K \leq N-1$") is arranged at a position different from positions of the test recording area and the information recording area of the $(K+1)^{th}$ through the $N^{th}$ recording layers in the radius direction of the recording medium.

In Patent Document 3, a pulse condition of a laser beam including the intensity of the laser beam is determined by using a result of the test recording and the correction information. With this, information is to be recorded with high reliability.

Similar to the present invention, in Patent Document 3, when suitable recording conditions are obtained in the $K^{th}$ layer, layers in front of the $K^{th}$ layer are caused to be in an unrecorded status, and the reliability of the OPC of the $K^{th}$ layer is made to be high. However, Patent Document 3 has the following problems.

FIG. 33 is a schematic diagram showing a first case where decentration exists between recording layers of a recording medium. FIG. 34 is a schematic diagram showing a second case where decentration exists between recording layers of a recording medium. In FIGS. 33 and 34, a black part in the K and (k+1) layers is a test recording area.

For example, when a test recording area of a K layer is shifted from a test recording area of a (K+1) layer in the radius direction of a recording medium, the reliability of the OPC in the K layer can be high. However, when the number of the recording layers is increased, a wider test recording area is required in the recording medium, and the recording capacity of the recording medium may be lowered.

As shown in FIG. 33 (a), when a test recording area of a K layer is shifted from a test recording area of a (K+1) layer in the radius direction of a recording medium, actually, a decentration and/or circularity (not being circular) amount is different between the K layer and the (K+1) layer. Therefore, as shown in FIG. 33 (b), the test recording area of the K layer may be overlapped by the test recording area of the (K+1) layer, and the reliability of the OPC may be lowered.

In order to prevent the overlap of the test recording area of the K layer on the test recording area of the (K+1) layer, as shown in FIG. 34, the test recording area of the K layer must be at a position away from the test recording area of the (K+1) layer by an amount of the decentration (generally, approximately 10 to 30 µm). However, in this case, the test recording area in the recording medium is remarkably increased and the recording capacity in the recording medium may be lowered.

In Patent Document 3, the suitable recording conditions in the K layer are obtained from the correction information in the combinations of the recorded statuses of the layers in front of the K layer. However, actually, the test recording cannot be executed on all the combinations; therefore, high recording reliability on the K layer may not be obtained.

When information is actually recorded in the K layer, as shown in FIG. 29, the recorded statuses of the layers in front of the K layer are different from each other. The suitable recording conditions of the K layer cannot be determined in all the recorded statuses of the layers in front of the K layer. Consequently, the recording reliability in the K layer may not be sufficient. The suitable recording conditions in the K layer based on the test recording can be obtained in the cases shown in FIG. 29 (a) and FIG. 29 (b) in which the suitable recording conditions can be obtained from the correction information.

In Patent Document 4, the recording order among the recording layers is determined. That is, after recording information in a recording layer at a front side, information is recorded in a recording layer positioned at a back side. However, similar to Patent Document 1, the recorded statuses of the recording layers at the front side may be different from each other as shown in FIG. 29. Therefore, when the number of the recording layers at the front side is increased, the suitable recording conditions in the recording layer where information is to be recorded cannot be determined by conventional OPC.

In Patent Documents 5 and 6, the recording order among the recording layers is determined. When information is recorded in a recording layer at a back side after recording information in a recording layer at a front side, the information recording in the recording layer at the front side influences the information recording in the recording layer at the back side. Therefore, after recording information in the recording layer at the back side, the information is recorded in the recording layer at the front side.

In Patent Documents 5 and 6, similar to the present invention, the recording order among the recording layers is determined. However, a specific method for determining the optimum recording power in each recording layer is not disclosed.

In Patent Document 7, a dummy signal has been recorded in a recording layer at a front side beforehand.

However, similar to Patent Document 1, this is effective when the recorded statuses of the recording layers are ideal. In the ideal situation, the recorded statuses do not have an unrecorded area duet to defects, and the recorded area does not have fluctuations and/or dispersions of the transmission rate of a laser beam. That is, it is difficult to realize this in an actual situation.

[Patent Document 1] Japanese Laid-Open Patent Application No. 2000-293947

[Patent Document 2] Japanese Laid-Open Patent Application No. 2003-22532

[Patent Document 3] Japanese Laid-Open Patent Application No. 2004-171740

[Patent Document 4] Japanese Laid-Open Patent Application No. 2000-285469

[Patent Document 5] Japanese Laid-Open Patent Application No. 10-269575

[Patent Document 6] Japanese Laid-Open Patent Application No. 3-157816

[Patent Document 7] Japanese Laid-Open Patent Application No. 2000-36130

SUMMARY OF THE INVENTION

In a preferred embodiment of the present invention, there is provided a method of recording data in a multilayered recordable optical recording medium, a recording and reproducing apparatus for recording the data in the recording medium, and the recording medium in which suitable recording conditions can be effectively obtained and recording capacity can be effectively utilized in the recording medium.

Features and advantages of the present invention are set forth in the description that follows, and in part will become apparent from the description and the accompanying drawings, or may be learned by practice of the invention according to the teachings provided in the description. Features and advantages of embodiments of the present invention will be realized and attained by a method of recording data in a multilayered recordable optical recording medium, a recording and reproducing apparatus for recording the data in the recording medium, and the recording medium particularly pointed out in the specification in such full, clear, concise, and exact terms so as to enable a person having ordinary skill in the art to practice the invention.

To achieve one or more of these and other advantages, according to one aspect of the present invention, there is provided a method of recording data in a multilayered recordable optical recording medium having N (N is an integer of 2 or more) recording layers each of which layers includes a test recording area where test recording is executed for obtaining an optimum recording condition for actual recording, and which method includes a data recording step in which data are sequentially recorded in the recording layers from a first recording layer at the farthest position to an $N^{th}$ recording layer at the nearest position viewed from a recording and reproducing laser beam inputting direction in order. The recording method includes a test recording executing step which sequentially executes test recording in recordable recording layers having unrecorded parts from a $p^{th}$ recording layer ($1 \leq p \leq N$) at a farthest position in the recordable recording layers to an arbitrary $q^{th}$ recording layer ($p \leq q \leq N$) in the recordable recording layers at the farthest position to the nearest position viewed from the recording and reproducing laser beam inputting direction, a test recording range using step which sequentially uses plural test recording ranges formed by dividing the test recording area in a radius direction from one end to the other end of the recording medium in each of the recording layers (hereinafter this direction is referred to as a test recording direction), and a shifting step which shifts the test recording range of an $(m+1)^{th}$ recording layer by a predetermined shifting distance relative to the test recording range of an $m^{th}$ recording layer in a direction inverse to the test recording direction.

According to another aspect of the present invention, there is provided a recording and reproducing apparatus for recording data in a multilayered recordable optical recording medium having N (N is an integer of 2 or more) recording layers each of which layers includes a test recording area where test recording is executed for obtaining an optimum recording condition for actual recording, and which sequentially records the data in the recording layers from a first recording layer at the farthest position to an $N^{th}$ recording layer at the nearest position viewed from a recording and reproducing laser beam inputting direction in order. The recording and reproducing apparatus includes a test recording executing unit which sequentially executes test recording in recordable recording layers having unrecorded parts from a $p^{th}$ recording layer ($1 \leq p \leq N$) at a farthest position in the recordable recording layers to an arbitrary $q^{th}$ recording layer ($p \leq q \leq N$) in the recordable recording layers at the farthest position to the nearest position viewed from the recording and reproducing laser beam inputting direction, a test recording range using unit which sequentially uses plural test recording ranges formed by dividing the test recording area in a radius direction from one end to the other end of the recording medium in each of the recording layers (hereinafter this direction is referred to as a test recording direction), and a shifting unit which shifts the test recording range of an $(m+1)^{th}$ recording layer by a predetermined shifting distance relative to the test recording range of an $m^{th}$ recording layer in a direction inverse to the test recording direction.

According to another aspect of the present invention, there is provided a multilayered recordable optical recording medium having N (N is an integer of 2 or more) recording layers each of which layers includes a test recording area where test recording is executed for obtaining an optimum recording condition for actual recording. The test recording area is formed from an inner circumferential side to an outer circumferential side of the recording medium and includes plural test recording ranges, and a test recording range of an $(m+1)^{th}$ recording layer is shifted by a predetermined shifting distance relative to a test recording range of an $m^{th}$ recording layer ($1 \leq m \leq (N-1)$).

EFFECT OF THE INVENTION

According to an embodiment of the present invention, when test recording is executed in a multilayered recordable optical recording medium having N recording layers (N is an integer of 2 or more), a test recording range in a test recording area of an $(m+1)^{th}$ recording layer is shifted relative to a test recording range in a test recording area of an $m^{th}$ recording layer by an amount greater than a difference of decentration amounts between the $m^{th}$ and the $(m+1)^{th}$ recording layers or a maximum decentration amount in the N recording layers. The shifting direction is inverse to a test recording range adding direction in a radius direction of the recording medium. Therefore, suitable recording conditions can be effectively obtained and recording capacity can be effectively utilized in the recording medium.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Best Mode of Carrying Out the Invention

The best mode of carrying out the present invention is described with reference to the accompanying drawings.

First Embodiment

Figure 1:
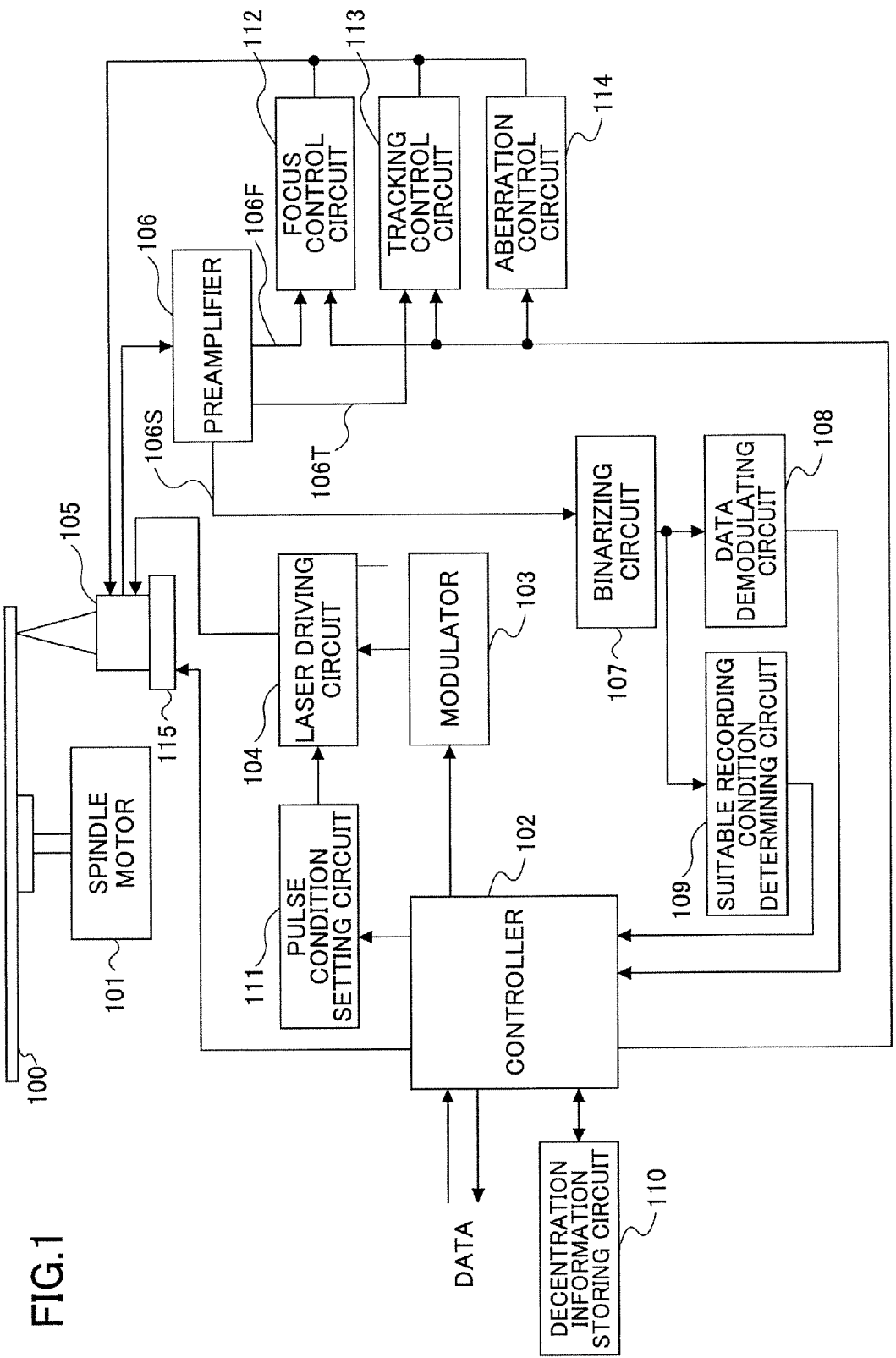
FIG. 1 is a block diagram showing a recording and reproducing apparatus according to a first embodiment of the present invention.

FIG. 1 is a block diagram showing a recording and reproducing apparatus according to a first embodiment of the present invention.

In FIG. 1, a multilayered recordable optical recording medium 100 (disk) has been attached to the recording and reproducing apparatus.

As shown in FIG. 1, the recording and reproducing apparatus includes a spindle motor 101, a controller 102, a modulator 103, a laser driving circuit 104, an optical head 105, a preamplifier 106, a binarizing circuit 107, a data demodulating circuit 108, a suitable recording condition determining circuit 109, a decentration information storing circuit 110, a pulse condition setting circuit 111, a focus control circuit 112, a tracking control circuit 113, an aberration control circuit 114, and a moving unit 115.

The spindle motor 101 drives the multilayered recordable optical recording medium 100. The controller 102 controls operations of the recording and reproducing apparatus. The modulator 103 modulates data to be recorded into a recording signal. The laser driving circuit 104 drives a semiconductor laser (not shown) based on the recording signal from the modulator 103. The optical head 105 includes the semiconductor laser, records information (data) in the multilayered recordable optical recording medium 100 by irradiating a laser beam on the multilayered recordable optical recording medium 100, and obtains a reproduction signal from light reflected from the multilayered recordable optical recording medium 100. The preamplifier 106 generates an information reproduction signal 106S, a focus error signal 106F, and a tracking error signal 106T by amplifying the reproduction signal. The binarizing circuit 107 binarizes the information reproduction signal 106S into a binarized signal. The data demodulating circuit 108 demodulates the binarized signal into data. The suitable recording condition determining circuit 109 determines suitable recording conditions from the quality of a signal obtained from test recording. The signal is obtained by the following process. In the process, specific data are recorded on trial in the test recording area of the multilayered recordable optical recording medium 100 and the recorded data are reproduced. The decentration information storing circuit 110 stores decentration information of the multilayered recordable optical recording medium 100 by reading from the multilayered recordable optical recording medium 100. The pulse condition setting circuit 111 controls intensity of a laser beam based on the suitable recording conditions determined by the suitable recording condition determining circuit 109. The focus control circuit 112 controls the optical head 105 based on the focus error signal 106F so that a laser beam focuses on a target recording layer of the multilayered recordable optical recording medium 100. The tracking control circuit 113 controls the optical head 105 based on the tracking error signal 106T so that a laser beam suitably scans a track of the multilayered recordable optical recording medium 100. The aberration control circuit 114 controls the optical head 105 so that aberration of a laser beam on the target recording layer of the multilayered recordable optical recording medium 100 becomes minimal. The moving unit 115 moves the optical head 105 in the diameter direction of the multilayered recordable optical recording medium 100.

Next, the operations of the recording and reproducing apparatus are described.

First, the recording and reproducing apparatus initializes the multilayered recordable optical recording medium 100. The initialization is a preparation for actual recording. Specifically, the recording and reproducing apparatus rotates the multilayered recordable optical recording medium 100 by connecting it to the spindle motor 101, and causes the optical head 105 to irradiate a laser beam onto the multilayered recordable optical recording medium 100.

In a recording method of the recording and reproducing apparatus, a laser beam is focused onto a first recording layer at a farthest position viewed from a laser beam input side, and the laser beam accesses a read-in area, tracks an information track, (or accesses a BCA (burst cutting area) without tracking), and reads information such as identification information, suitable recording condition information (recommendation value), and decentration amount information of the multilayered recordable optical recording medium 100.

When the information such as the identification information, the suitable recording condition information (recommendation value), and the decentration amount information is read, the information reproduction signal 106S obtained from light reflected from the multilayered recordable optical recording medium 100 at the optical head 105 via the preamplifier 106 is binarized in the binarizing circuit 107, the binarized signal is demodulated at the data demodulating circuit 108, and the demodulated signal is input to the controller 102. The read decentration amount information is stored in the decentration information storing circuit 110.

Next, in a test recording area of the first recording layer, test recording for obtaining suitable recording conditions is executed by referring to the suitable recording condition information (recommendation value).

After recording specific data in the test recording area on trial, the recorded data are reproduced, the suitable recording condition determining circuit 109 determines signal quality of the reproduced data, and the suitable recording conditions in the first recording layer are determined.

Next, the laser beam is focused on a second recording layer in front of the first recording layer viewed from the laser beam irradiating side, and suitable recording conditions of the second recording layer are determined by using processes similar to those in the first recording layer. In the second recording layer, the test recording range is shifted from that of the first recording layer by considering a difference of decentration amounts among the recording layers (described below in detail).

When the above processes are repeated for all the recording layers, the initialization of the multilayered recordable optical recording medium 100 in the recording and reproducing apparatus is completed.

When data to be recorded are input to the controller 102, the data are recorded in the corresponding recording layers under the suitable recording conditions determined by the initialization. The number of the initialization times can be only once when the recording and reproducing apparatus is not turned off or when the multilayered recordable optical recording medium 100 is detached from the recording and reproducing apparatus.

The information of the decentration amounts of the recording layers can be stored in each recording layer, or in a read-in area and/or a BCA of an arbitrary recording layer.

Next, the test recording in the multilayered recordable optical recording medium 100 is described in detail.

In the multilayered recordable optical recording medium 100, when a recording layer at a farthest position viewed from a laser beam irradiating side is defined as a first recording layer and a recording layer at a nearest position viewed from the laser beam irradiating side is defined as an $N^{th}$ recording layer, actual information recording is sequentially executed from the first recording layer to the $N^{th}$ recording layer (N is an integer of 2 or more).

With this, recording layers in front of a target recording layer to which information is to be recorded are always in an unrecorded status; therefore, the recording conditions of the target recording layer do not need to be adjusted by a combination of the recording conditions of the recording layers in front of the target recording layer.

Figure 29:
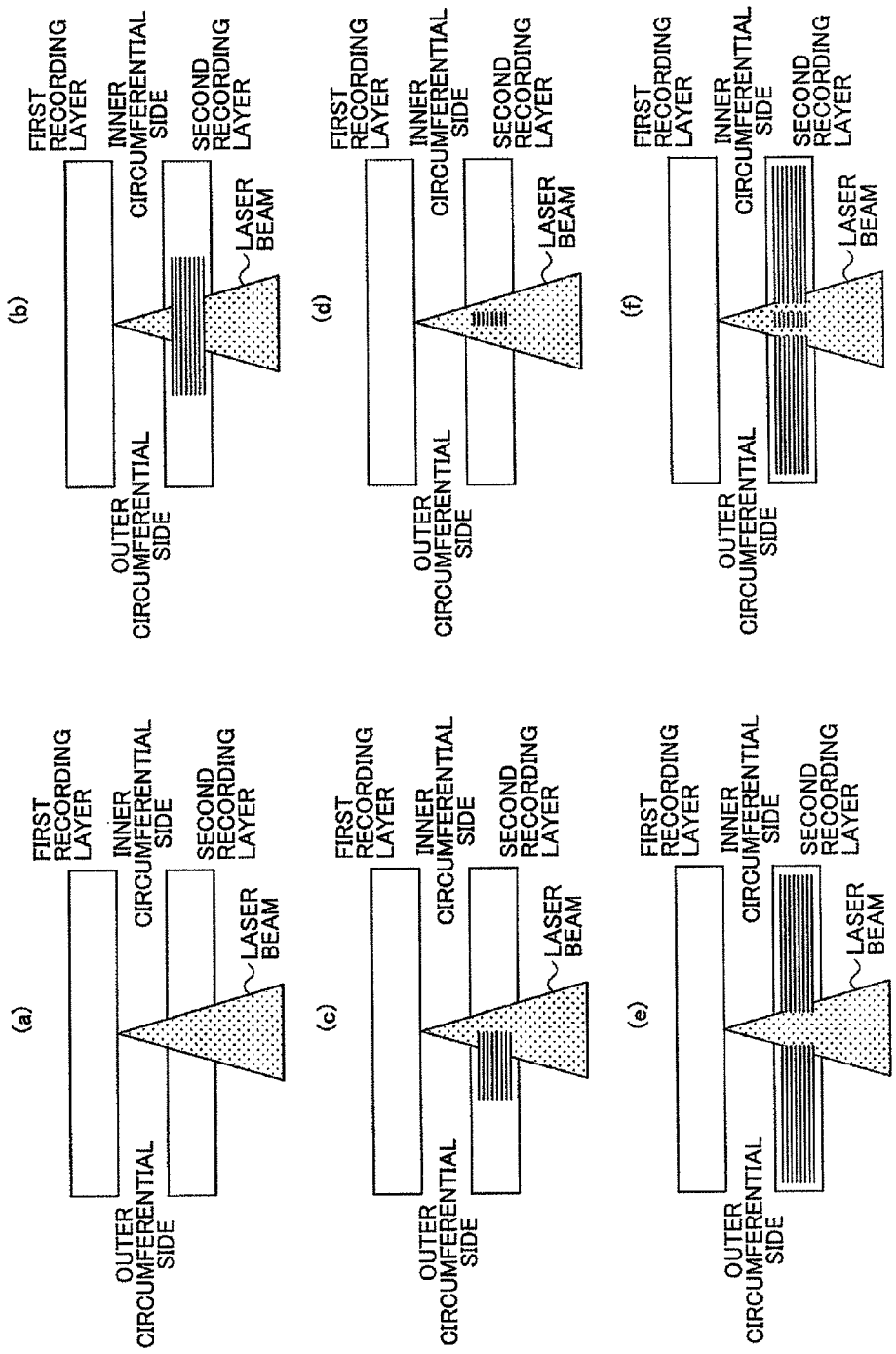
FIG. 29 is a schematic diagram showing a status difference among the second recording layers when information is recorded in a first recording layer.
Figure 30:
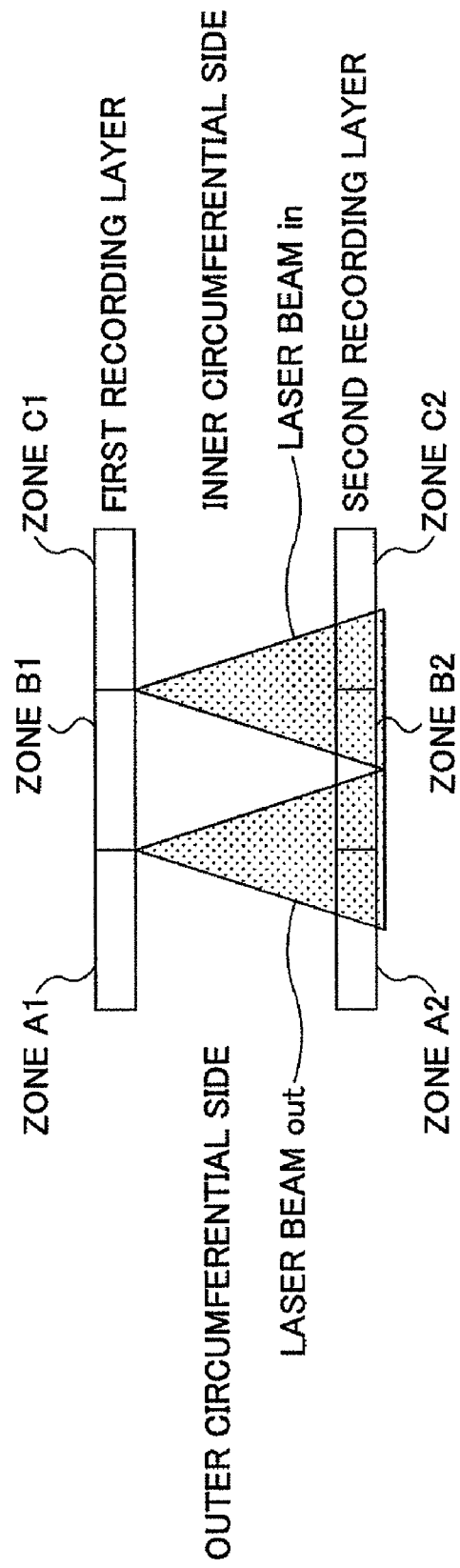
FIG. 30 is a schematic diagram showing zones when a recording area of a recording layer is divided into plural zones.
Figure 31:
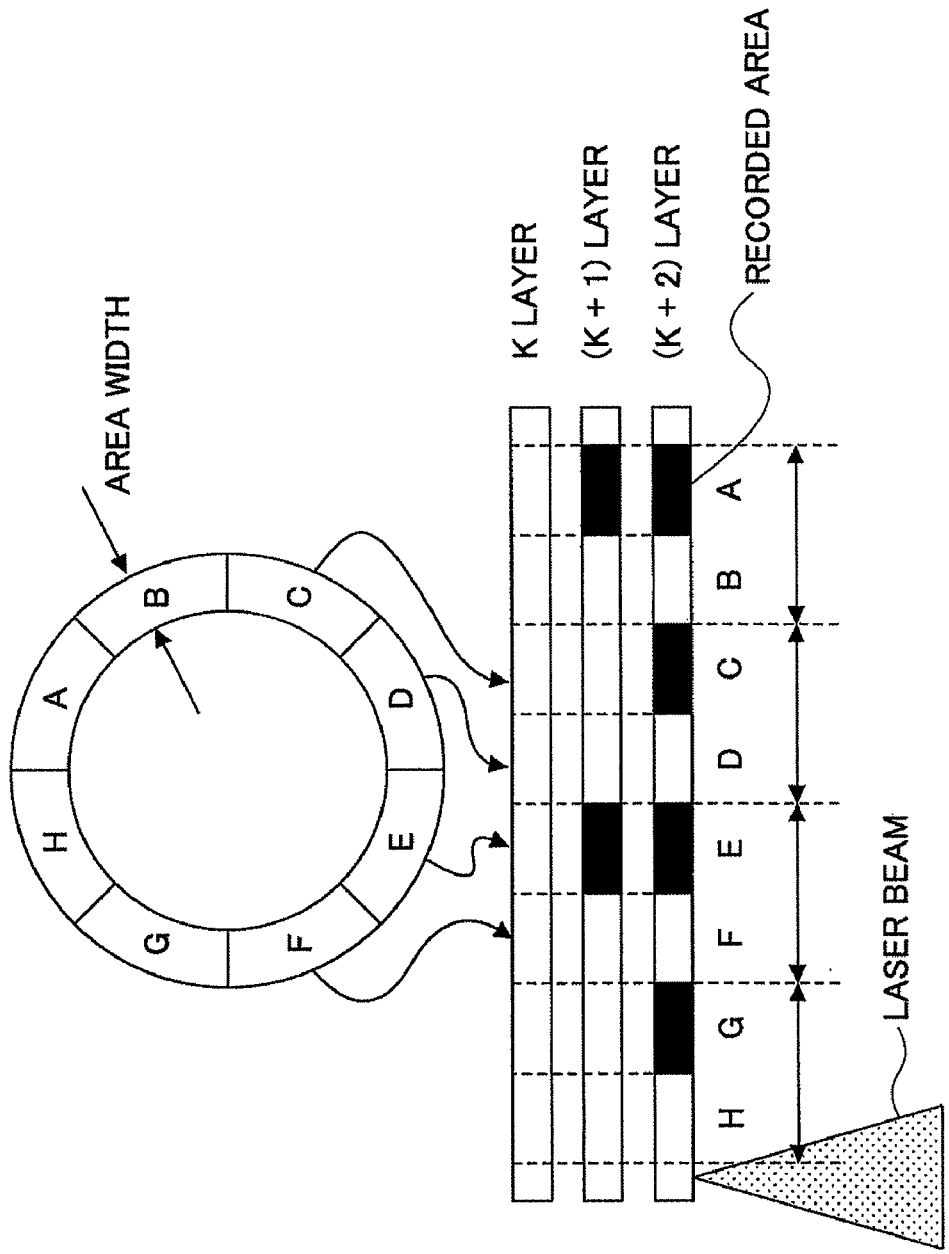
FIG. 31 is a schematic diagram in which combinations of recorded statuses of recording layers are in a circumferential direction of a recording medium when information is recorded in a farthest recording layer behind front recording layers.
Figure 32:
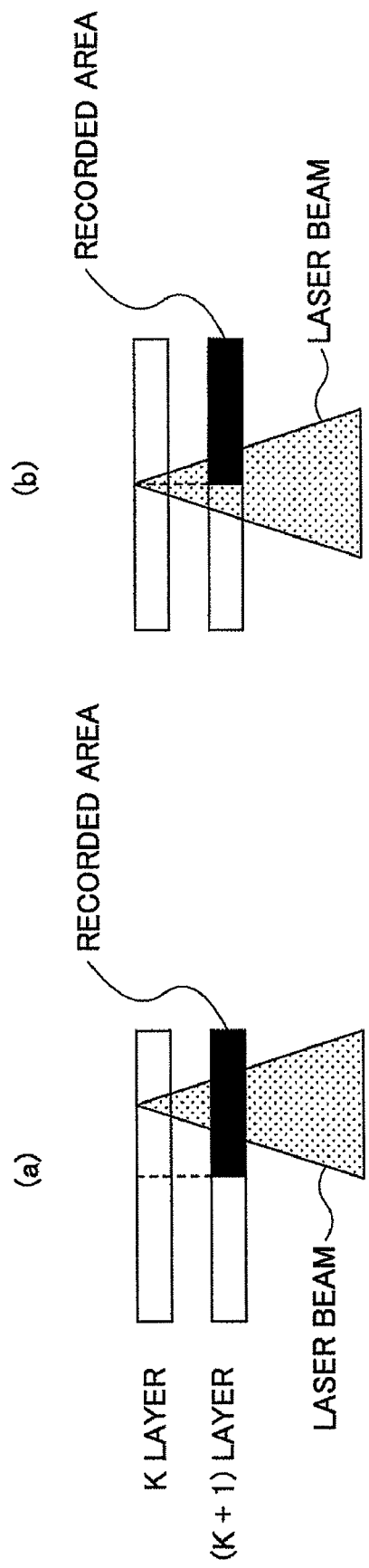
FIG. 32 is a schematic diagram showing a difference between recorded statuses in a front recording layer when information is being recorded in a recording layer behind the front recording layer.
Figure 33:
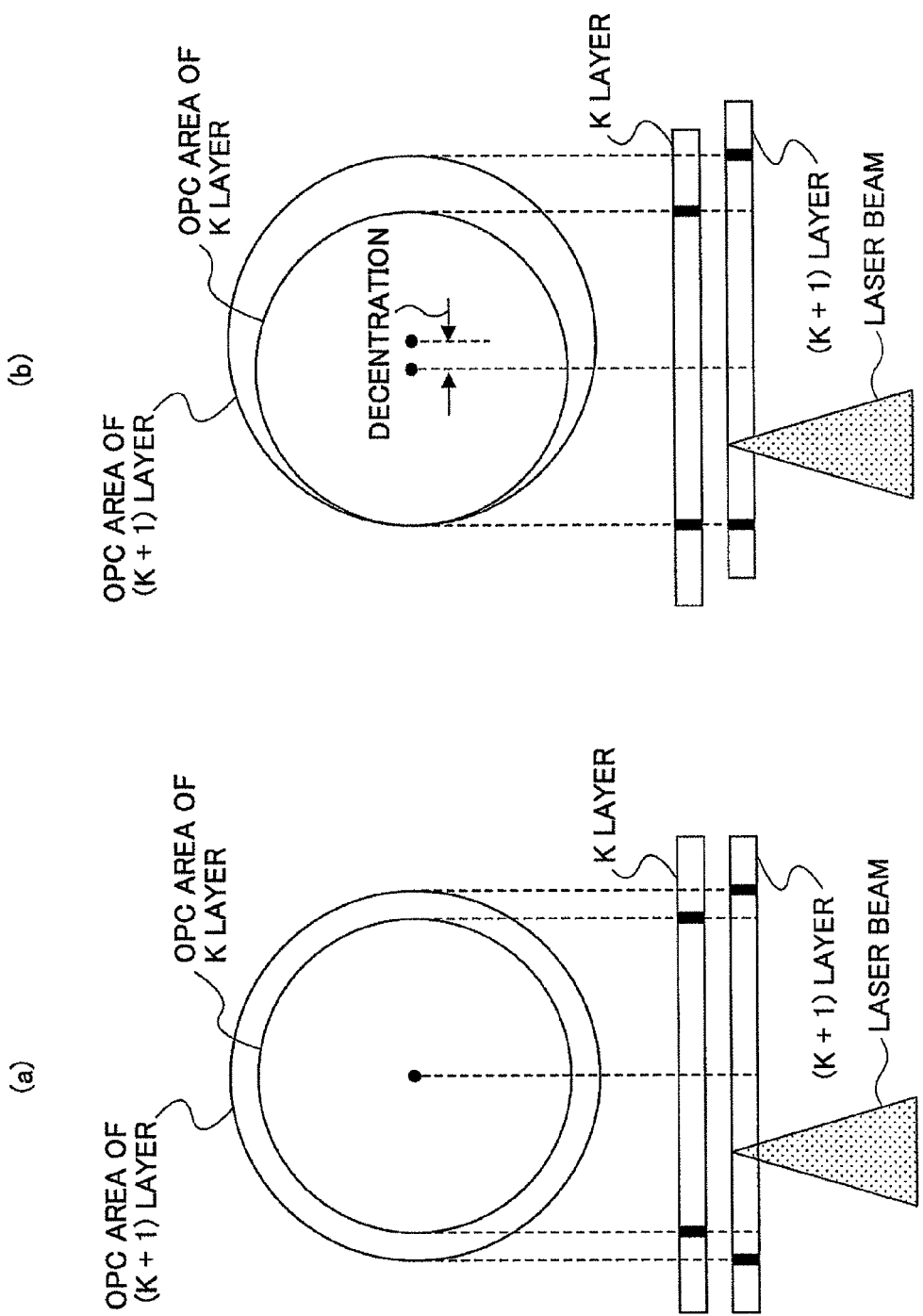
FIG. 33 is a schematic diagram showing a first case where decentration exists between recording layers of a recording medium.
Figure 34:
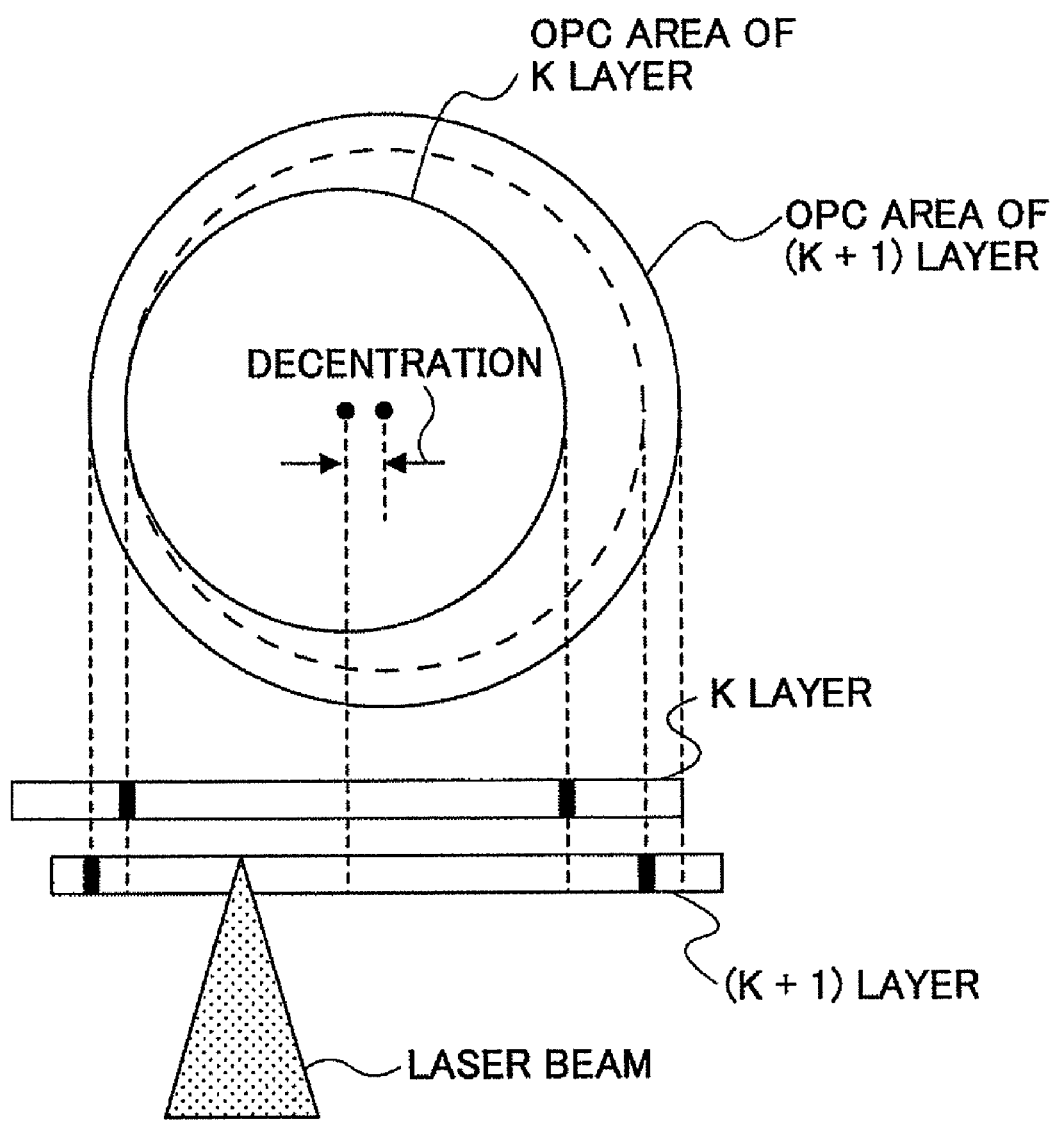
FIG. 34 is a schematic diagram showing a second case where the decentration exists between recording layers of the recording medium.

As shown in FIG. 29, when the actual information recording is not executed from the first recording layer to the second recording layer in order, the recording conditions of the first layer must be adjusted depending on the recorded statuses shown in FIG. 29 (a) to (f).

In FIG. 29, there are only two recording layers and it can be assumed that the suitable recording conditions of the first recording layer are relatively easily obtained. However, when the number of the recording layers in front of the first recording layer is increased, it can be assumed that the suitable recording conditions of the first recording layer are not easily obtained.

Figure 2:
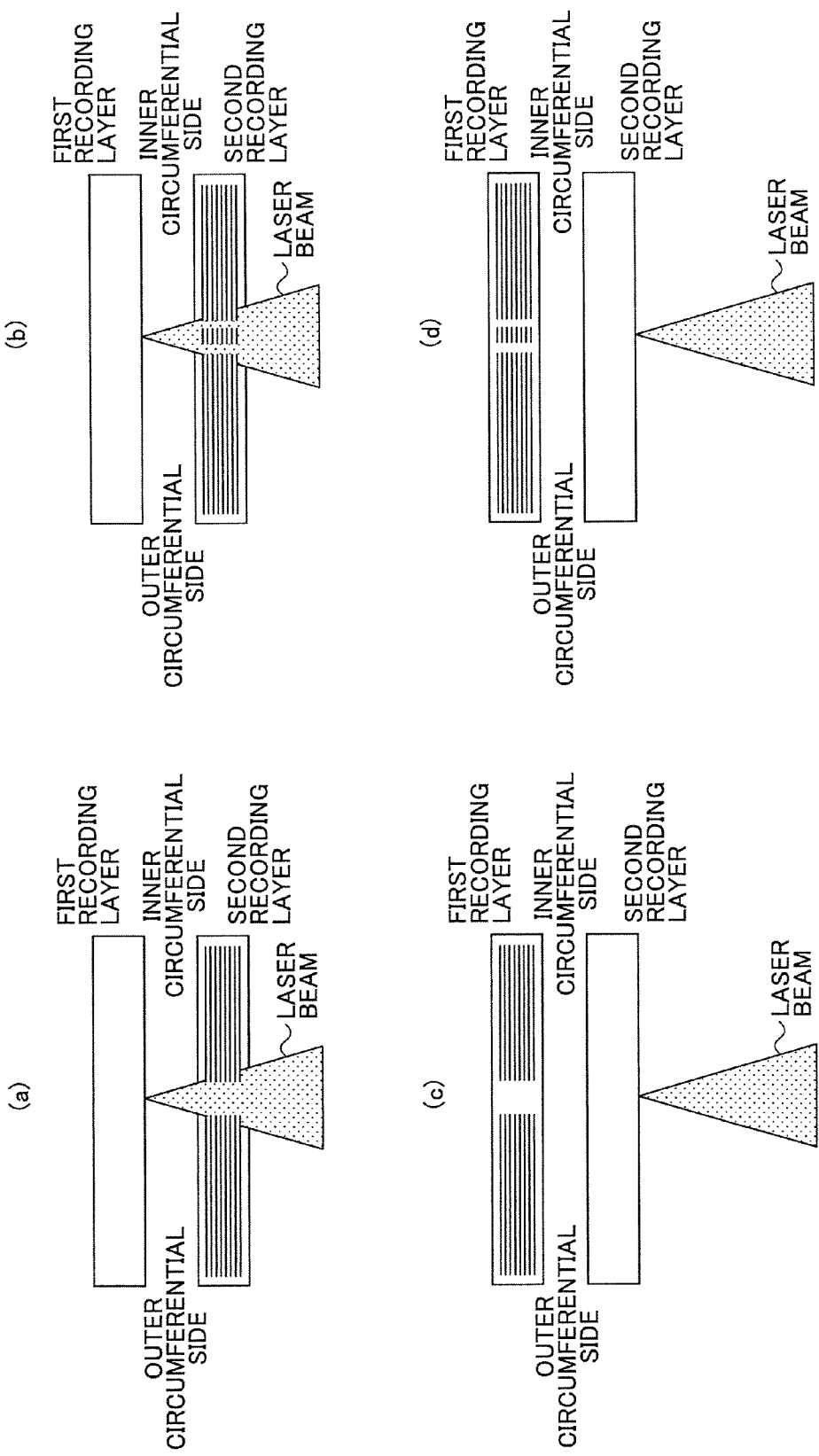
FIG. 2 is a schematic diagram showing cases in which information has been recorded in a recording layer and information has not been recorded in another recording layer in a multilayered recordable optical recording medium shown in FIG. 1.

FIG. 2 is a schematic diagram showing cases in which information has been recorded in a recording layer and information has not been recorded in another recording layer. In FIG. 2, a part where horizontal lines exist is an information recorded part.

In FIGS. 2 (a) and (b), information has been recorded in a second recording layer in front of a first recording layer where new information is to be recorded. In FIGS. 2 (c) and (d), information has not been recorded in the second recording layer in front of the first recording layer in which second recording layer new information is to be recorded.

Different from the first embodiment of the present invention, in a case where information is first recorded in the second recording layer and after this, new information is recorded in the first recording layer; when the information has been recorded in all tracks of the second recording layer without a defect, the suitable recording conditions in the first recording layer can be obtained. However, the recorded statuses shown in FIGS. 2 (a) and (b) actually occur due to the defects and/or recording timing of information in the second recording layer, and in this case, recording quality in the first recording layer may be lowered when the recording conditions of the first recording layer are not adjusted.

In the present embodiment, since information has not been exactly recorded in the first recording layer, cases shown in FIGS. 2 (c) and (d) occur. However, when new information is recorded in the second recording layer, since the recorded status of the first recording layer hardly influences the second recording layer, the suitable recording conditions do not need to be adjusted based on the recorded status of the first recording layer.

Figure 3:
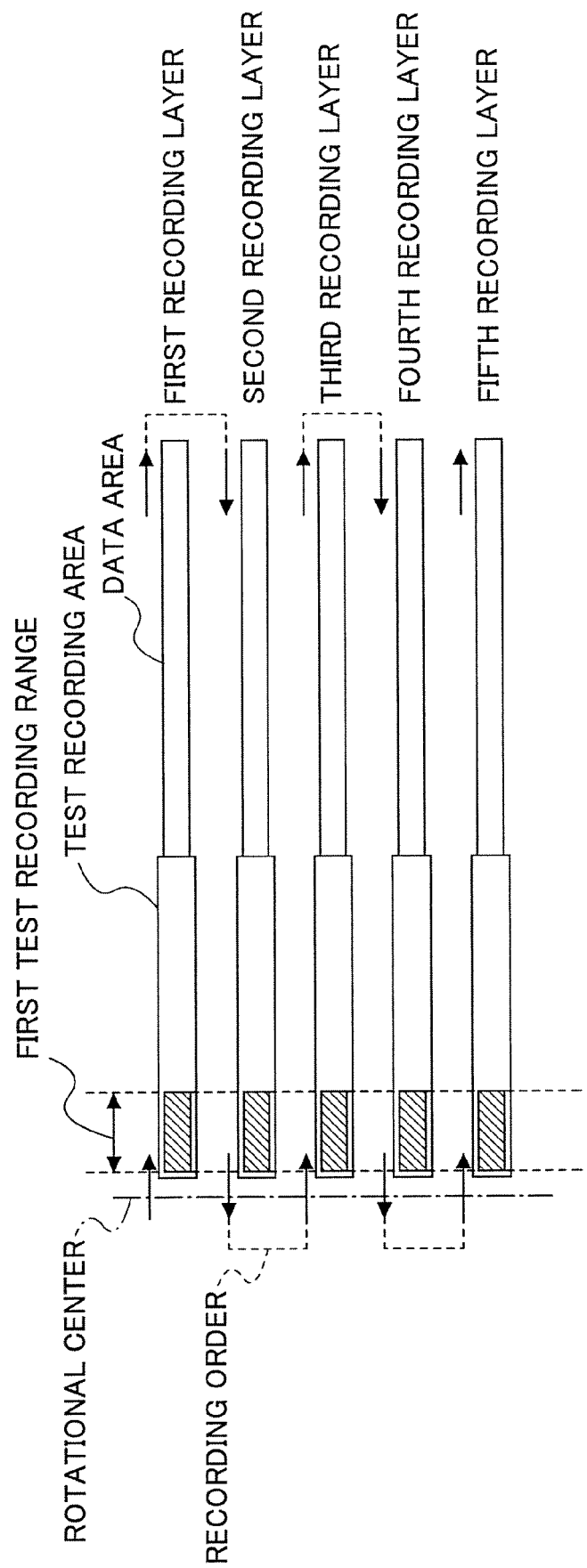
FIG. 3 is a schematic diagram showing first test recording in the multilayered recordable optical recording medium shown in FIG. 1.

Next, referring to the drawings, problems in the test recording are described. FIG. 3 is a schematic diagram showing first test recording.

When information (data) is recorded in the recording layers in order from the first recording layer to the $N^{th}$ recording layer, the information can be recorded in the recording layers in order without any big problem. However, a test recording method must be determined.

For example, every time when a multilayered recordable optical recording medium 100 is attached to the recording and reproducing apparatus, the test recording is applied to all the recording layers and the suitable recording conditions are determined in all the recording layers. In this case, as shown in FIG. 3, in first test recording ranges (hatched parts), the first test recording is applied in order from a first recording layer to a fifth recording layer.

Figure 4:
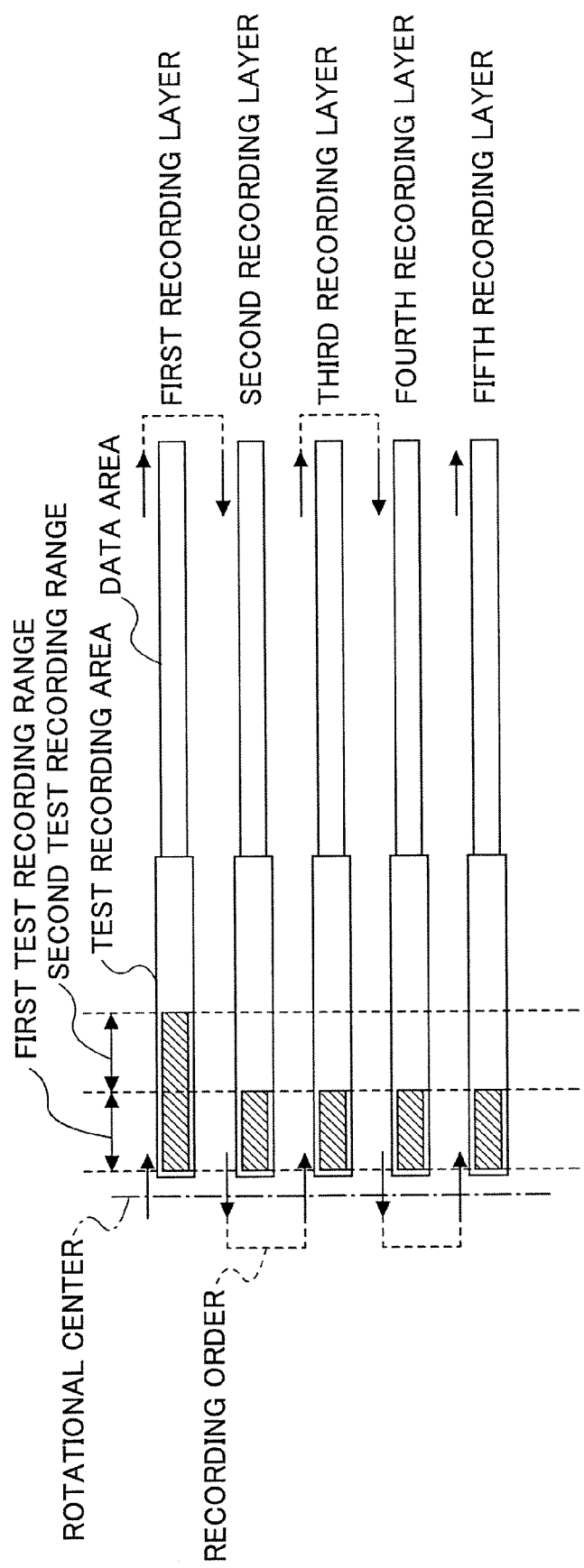
FIG. 4 is a schematic diagram showing a case in which second test recording is executed after executing ideal first test recording in the multilayered recordable optical recording medium shown in FIG. 1.

FIG. 4 is a schematic diagram showing a case in which second test recording is executed after executing ideal first test recording.

After the first test recording has been executed in all the recording layers for actual recording and the suitable recording conditions in all the recording layers have been determined, when the actual recording is not executed, for example, the multilayered recordable optical recording medium is detached from the recording and reproducing apparatus, second test recording must be executed.

As shown in FIG. 4, in a case where the second test recording is executed in the first recording layer after the first test recording, when the test recording start position of the second test recording in the first recording layer does not overlap the test recorded ranges of the second through fifth recording layers, in the second test recording, the suitable recording conditions of the first through fifth recording layers can be accurately determined.

As shown in FIG. 4, even if the first test recording is executed by determining the first test recording ranges with use of an address and a position in the radius direction so that the second test recording ranges do not overlap the first test recording ranges, actually, decentration and circularity of the tracks of the recording layers are different from each other.

Figure 5:
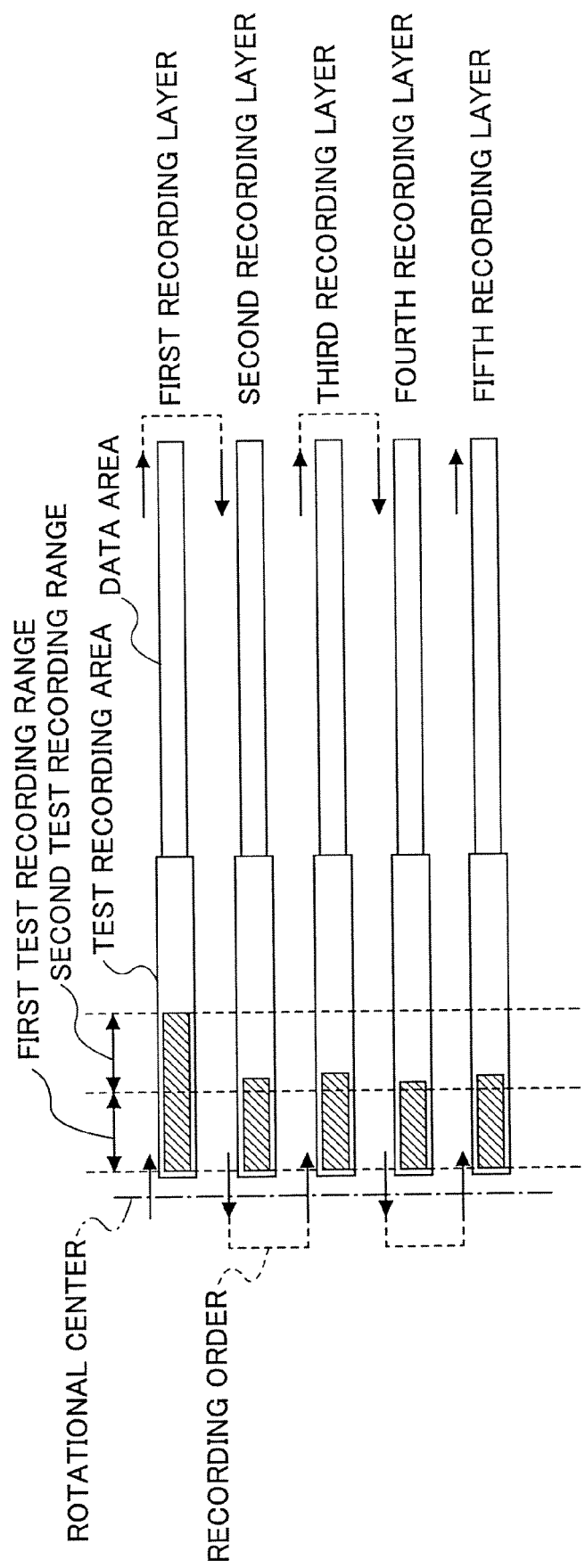
FIG. 5 is a schematic diagram showing a case in which the first test recording has not been executed ideally in the multilayered recordable optical recording medium shown in FIG. 1.

FIG. 5 is a schematic diagram showing a case in which the first test recording has not been executed ideally.

Therefore, as shown in FIG. 5, when the second test recording is executed in the first recording layer, the test recording start position of the second test recording in the first recording layer may overlap the test recorded ranges of the second through fifth recording layers in the second test recording; consequently, the reliability of the second test recording in the first recording layer may be remarkably lowered.

Figure 6:
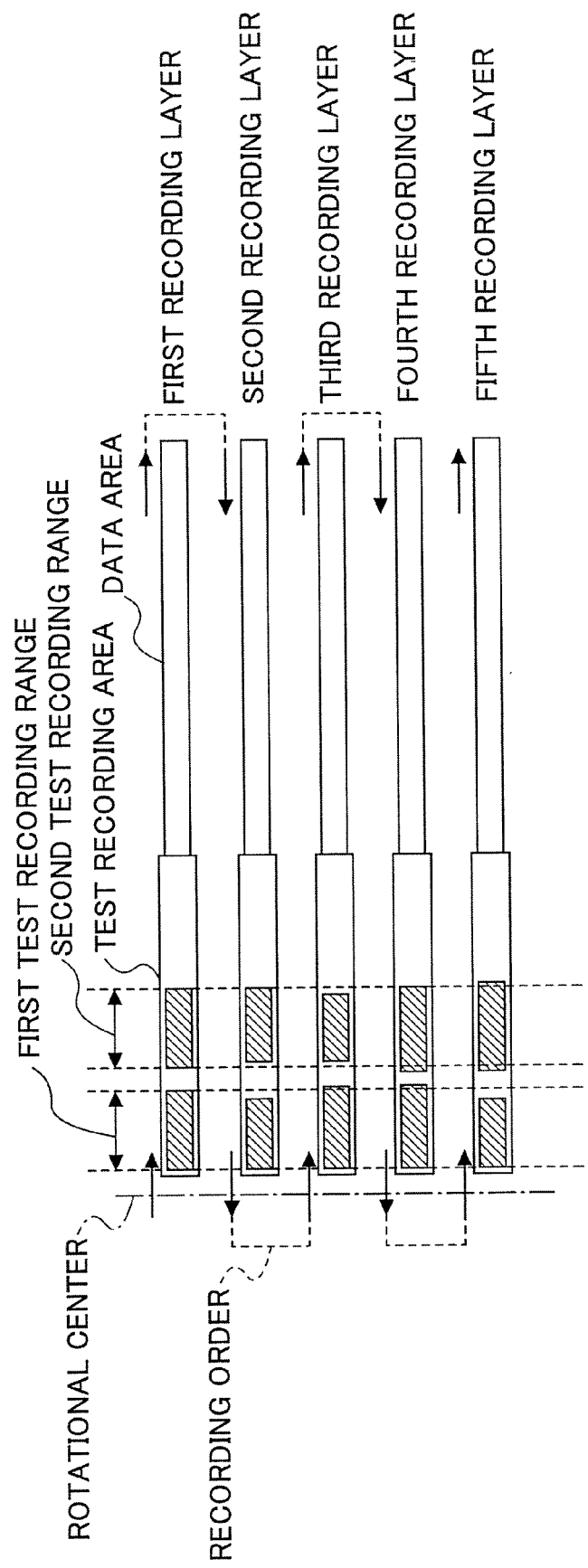
FIG. 6 is a schematic diagram showing a case in which a margin exists between a first test recording range and a second test recording range in the multilayered recordable optical recording medium shown in FIG. 1.

FIG. 6 is a schematic diagram showing a case in which a margin exists between the first test recording range and the second test recording range.

In order to solve the above problem, as shown in FIG. 6, the first and second test recording ranges are disposed so that a margin exists between them by considering the decentration of the first through fifth recording layers. However, the amount of the decentration is approximately tens of μm. When the number of the test recording times is increased, the number of the test recording ranges must be increased, and the size of the data area must be decreased.

Figure 7:
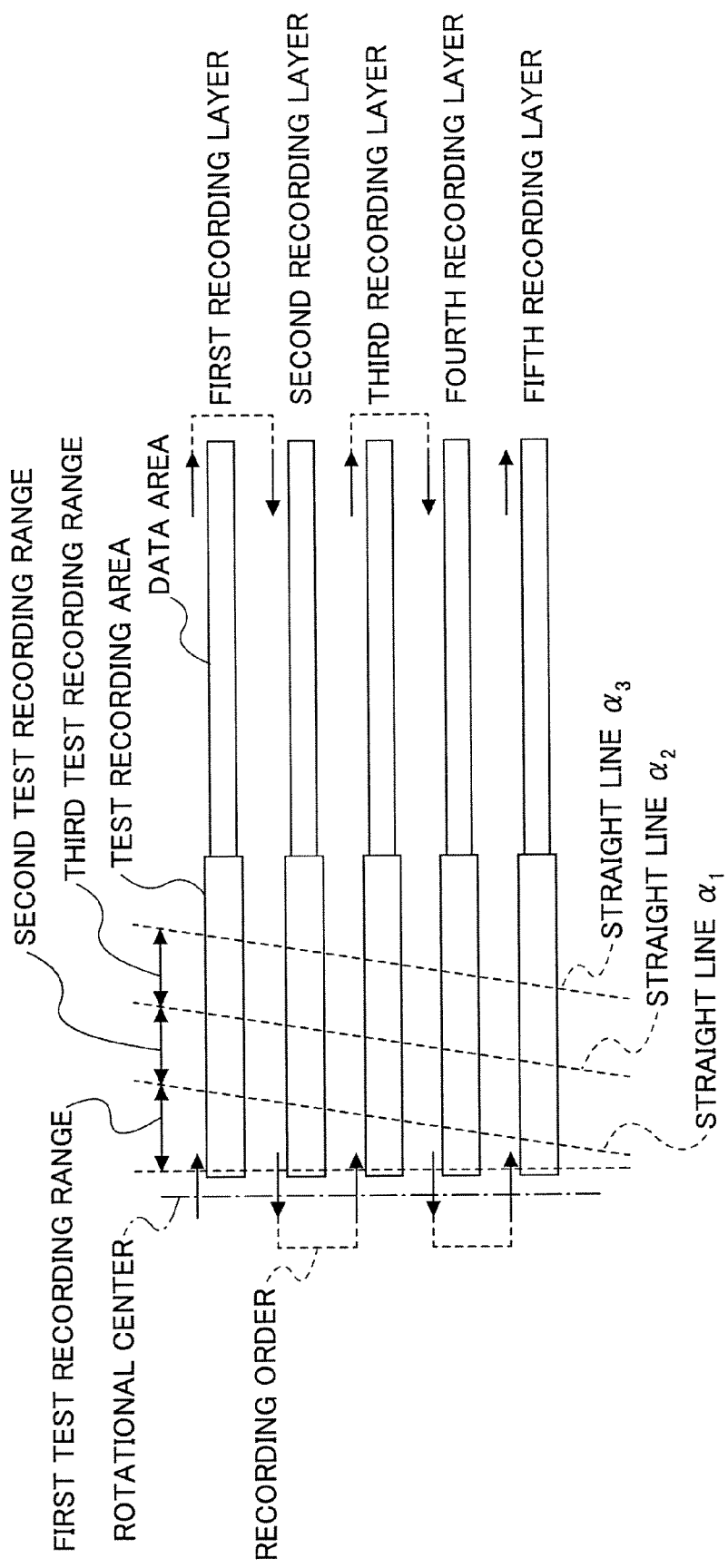
FIG. 7 is a schematic diagram showing the test recording ranges in the multilayered recordable optical recording medium shown in FIG. 1.

FIG. 7 is a schematic diagram showing test recording ranges according to the first embodiment of the present invention.

In the present embodiment, in order to obtain test recording of high reliability without decreasing the recording capacity of the recording medium, a structure is determined in which the test recording ranges of the first through fifth recording layers are shifted so that the decentration amounts of the first and fifth recording layers are absorbed.

As shown FIG. 7, after the first test recording has been executed in each of the recording layers, in test recording on and after the second test recording, the test recording ranges of the recording layers are moved in the outer circumferential side of the recording medium. In addition, the test recording range of an $(m+1)^{th}$ recording layer is shifted in the inner circumferential direction of the recording medium relative to an $m^{th}$ recording layer ($1 \leq m \leq (N-1)$).

The shifting amount (distance) of the test recording range in each of the recording layers can be determined by the differences of the decentration amounts among the recording layers.

That is, the outer circumferential side end of the test recording range of the $(m+1)^{th}$ recording layer is shifted in the inner circumferential direction relative to the outer circumferential side end of the test recording range of the $m^{th}$ recording layer by an amount more than the difference of the decentration amounts between the $m^{th}$ recording layer and the $(m+1)^{th}$ recording layer.

When the maximum difference of the decentration amounts between a recording layer having the maximum decentration amount and a recording layer having the minimum decentration amount is defined as "w0", the outer circumferential side end of the test recording range of the $(m+1)^{th}$ recording layer is shifted in the inner circumferential direction relative to the outer circumferential side end of the test recording range of the $m^{th}$ recording layer by an amount more than "w0".

The shifting amount of the test recording range can be determined by the difference of the decentration amounts between the $m^{th}$ recording layer and the $(m+1)^{th}$ recording layer. However, it is preferable that the shifting amount of the test recording range be fixed to be a value greater than the maximum decentration amount "w" among the recording layers due to easiness of the determination.

In FIG. 7, when the shifting amount of the test recording range is determined by the maximum decentration amount "w", the test recording ranges can be determined by straight lines $\alpha_1$ through $\alpha_3$.

Next, referring to FIGS. 8 through 14, actual test recording according to the present embodiment is described.

Figure 8:
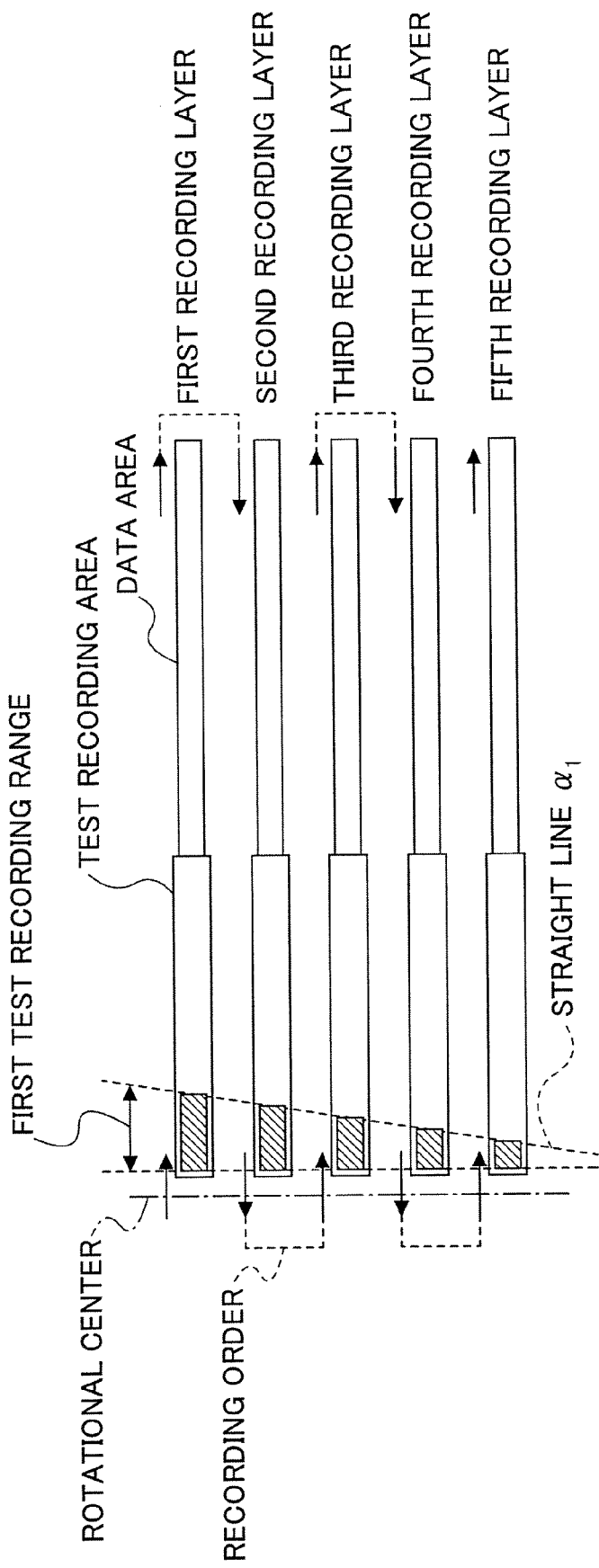
FIG. 8 is a schematic diagram showing first test recording in the first recording ranges of first through fifth recording layers in the multilayered recordable optical recording medium shown in FIG. 1.

FIG. 8 is a schematic diagram showing first test recording in the first recording ranges of the first through fifth recording layers.

In FIG. 8, the first test recording is sequentially executed in the first through fifth recording layers in order.

At this time, as described above, the test recording range of the $(m+1)^{th}$ recording layer is shifted in the inner circumferential direction relative to the test recording range of the $m^{th}$ recording layer based on the maximum decentration amount "w".

When the test recording is executed in the $m^{th}$ recording layer, the recording layers in front of the $m^{th}$ layer are in the unrecorded status viewed from the laser beam irradiating side; therefore, the suitable recording conditions of the $m^{th}$ recording layer can be accurately determined.

Figure 9:
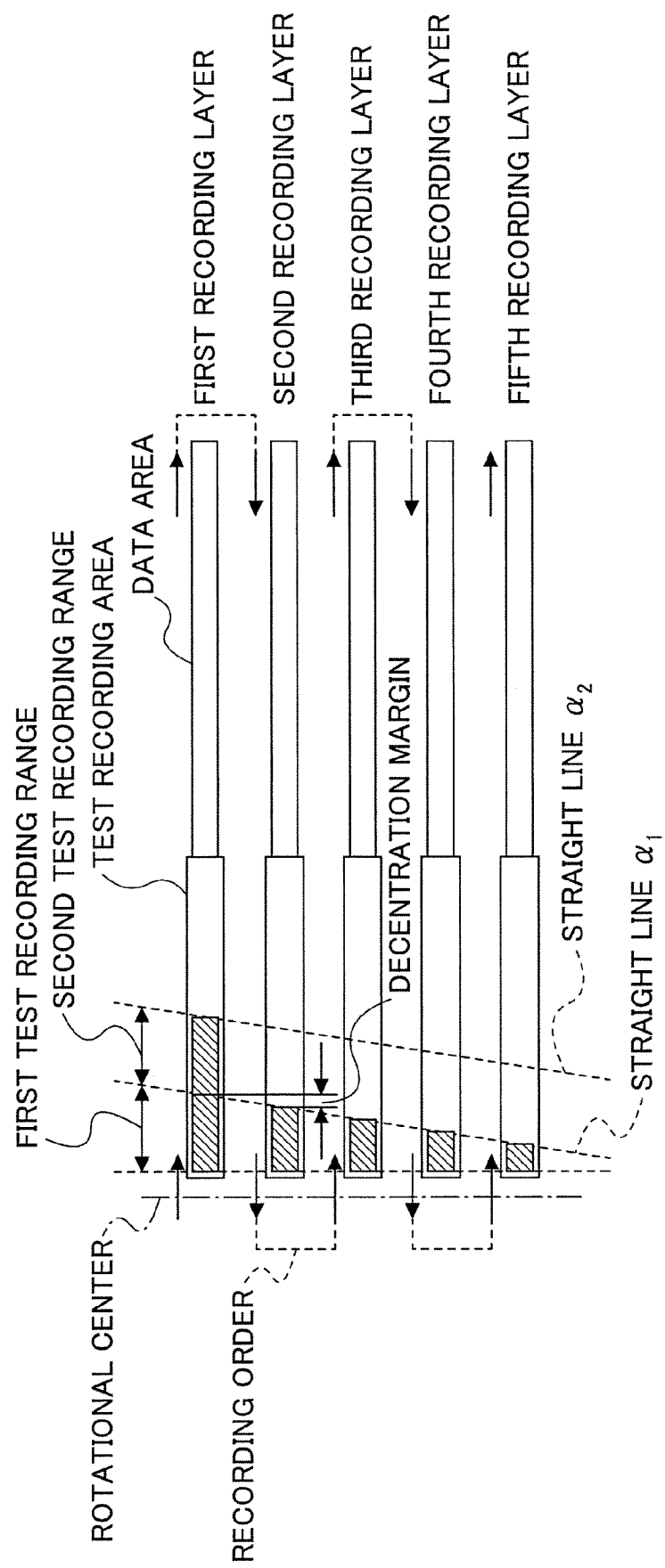
FIG. 9 is a schematic diagram showing a second test recording range in the first recording layer in the multilayered recordable optical recording medium shown in FIG. 1.

FIG. 9 is a schematic diagram showing a second test recording range in the first recording layer.

As shown in FIG. 9, the outer circumferential side end of the first test recording range of the second recording layer is largely shifted in the inner circumferential direction relative to the outer circumferential side end of the first test recording range of the first recording layer. That is, when the maximum decentration amount is defined as "w", the outer circumferential side end of the first test recording range of the second recording layer is shifted by an amount greater than "w" in the inner circumferential direction relative to the outer circumferential side end of the first test recording range of the first recording layer. Therefore, in the second test recording, the second recording layer can be in the unrecorded status in the second test recording range of the first recording layer. That is, as shown in FIG. 9, a decentration margin can exist.

Figure 10:
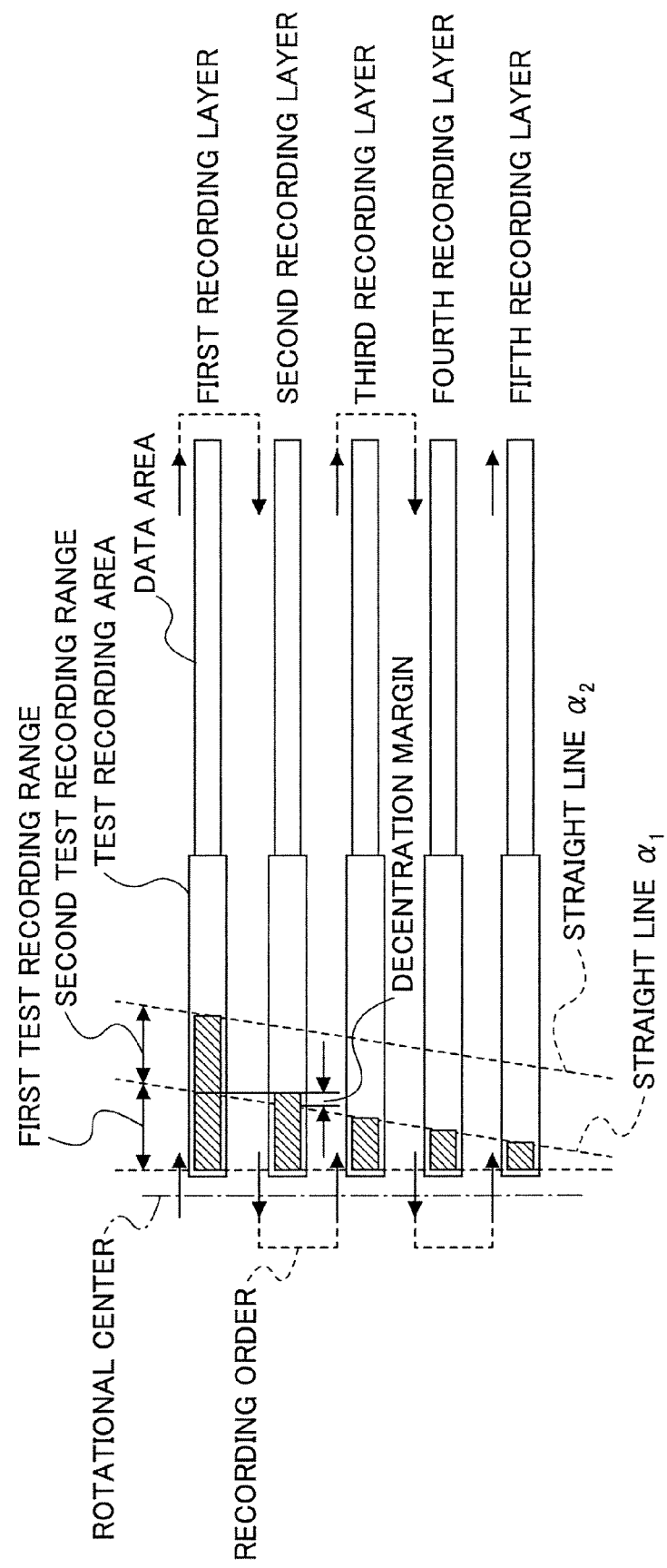
FIG. 10 is a schematic diagram showing the second test recording in which a decentration margin exists between the first and second test recording ranges in the multilayered recordable optical recording medium shown in FIG. 1.

FIG. 10 is a schematic diagram showing the second test recording in which the decentration margin exists between the first and second test recording ranges.

As shown in FIG. 10, even if the decentration exists in the recording medium, the outer circumferential side end of the first test recording region of the second recording layer does not overlap the starting position of the second test recording region of the first recording layer due to the decentration margin between the first and second recording layers.

Figure 11:
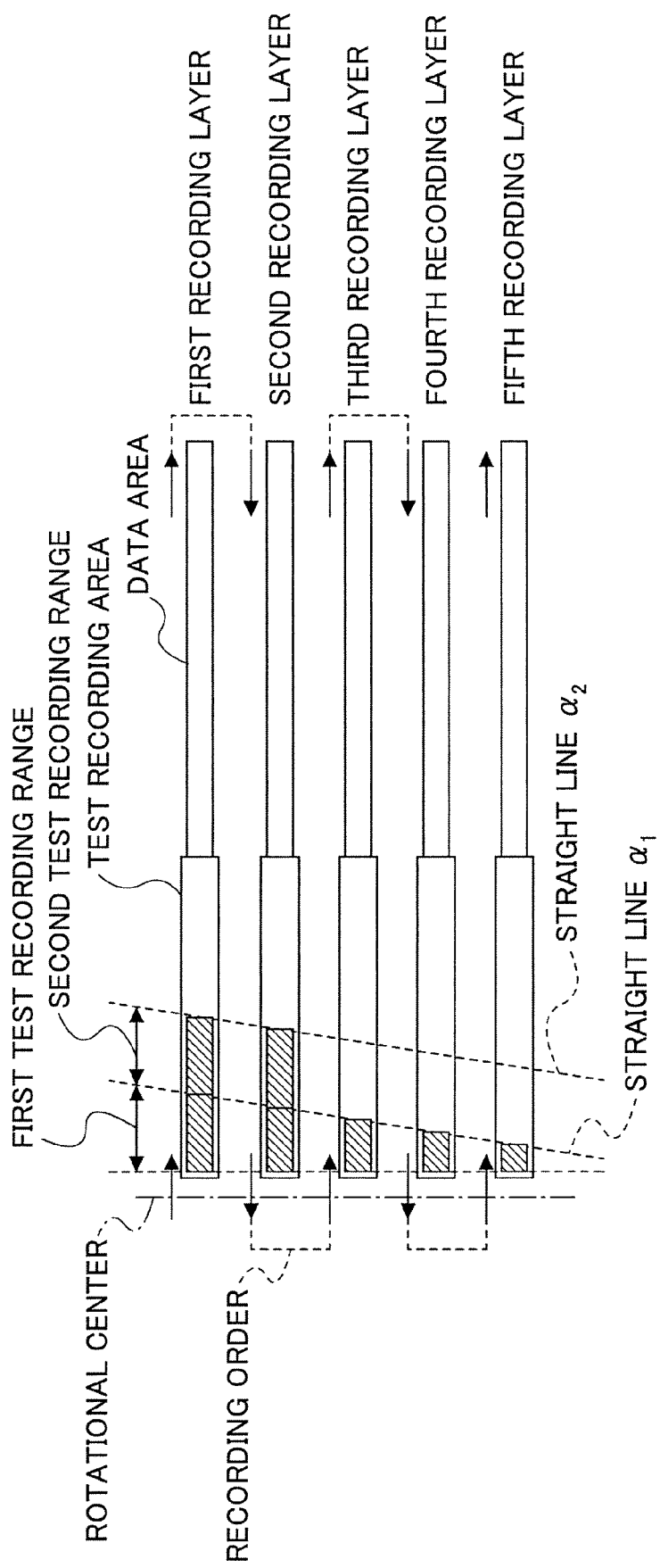
FIG. 11 is a schematic diagram showing the second test recording in the second recording layer in the multilayered recordable optical recording medium shown in FIG. 1.

FIG. 11 is a schematic diagram showing the second test recording in the second recording layer.

Figure 12:
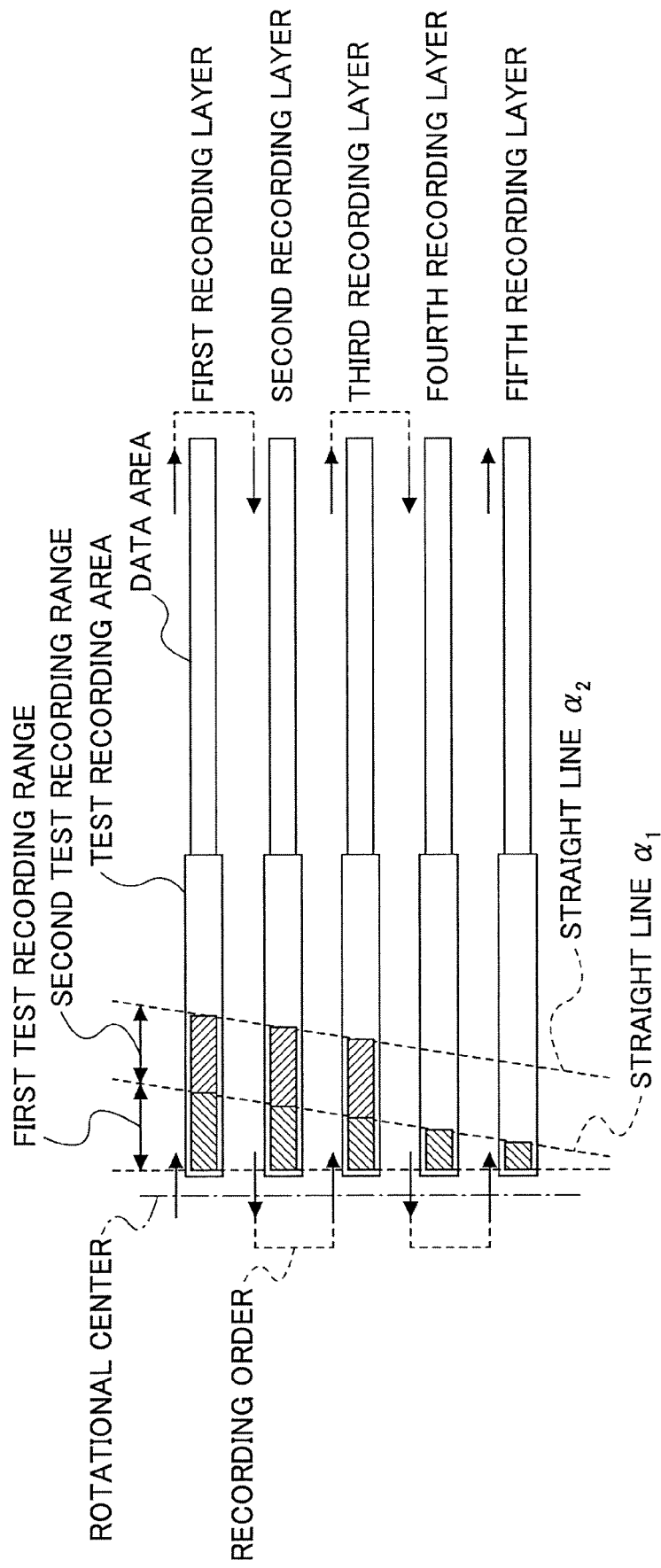
FIG. 12 is a schematic diagram showing the second test recording in the third recording layer in the multilayered recordable optical recording medium shown in FIG. 1.

FIG. 12 is a schematic diagram showing the second test recording in the third recording layer.

Figure 13:
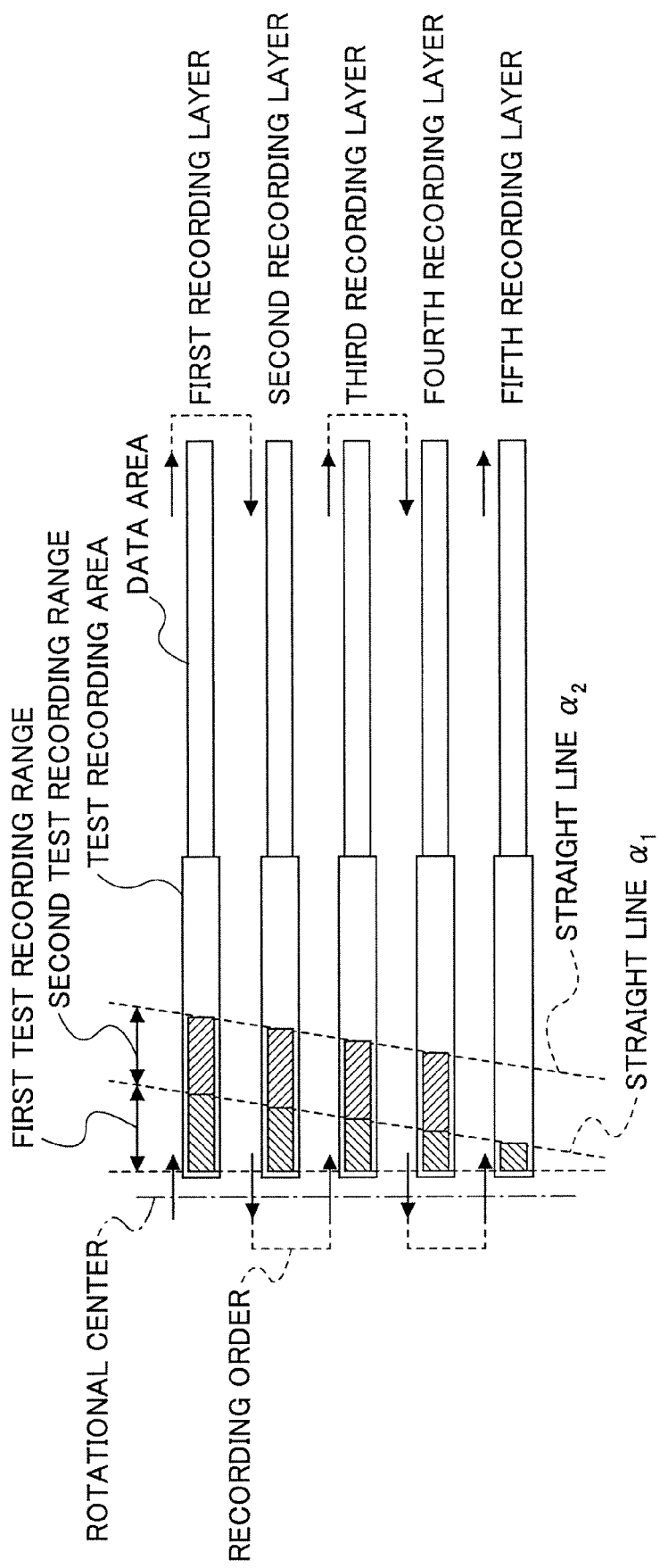
FIG. 13 is a schematic diagram showing the second test recording in the fourth recording layer in the multilayered recordable optical recording medium shown in FIG. 1.

FIG. 13 is a schematic diagram showing the second test recording in the fourth recording layer.

Figure 14:
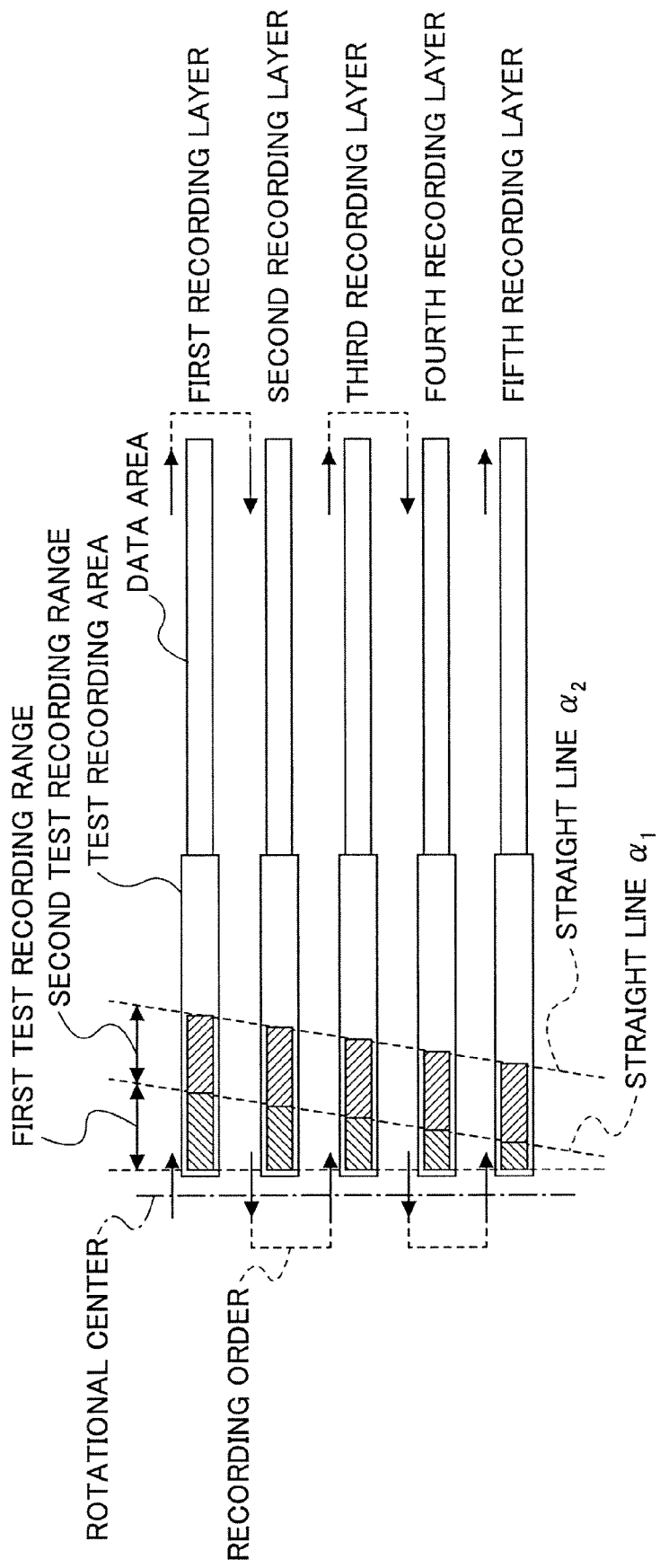
FIG. 14 is a schematic diagram showing the second test recording in the fifth recording layer in the multilayered recordable optical recording medium shown in FIG. 1.

FIG. 14 is a schematic diagram showing the second test recording in the fifth recording layer.

As shown in FIGS. 8 through 14, when test recording is executed in the $m^{th}$ recording layer, the recording layers in front of the $m^{th}$ recording layer viewed from the laser beam irradiating side are in the unrecorded status. Therefore, the suitable recording conditions in the $m^{th}$ recording layer can be accurately determined.

Figure 15:
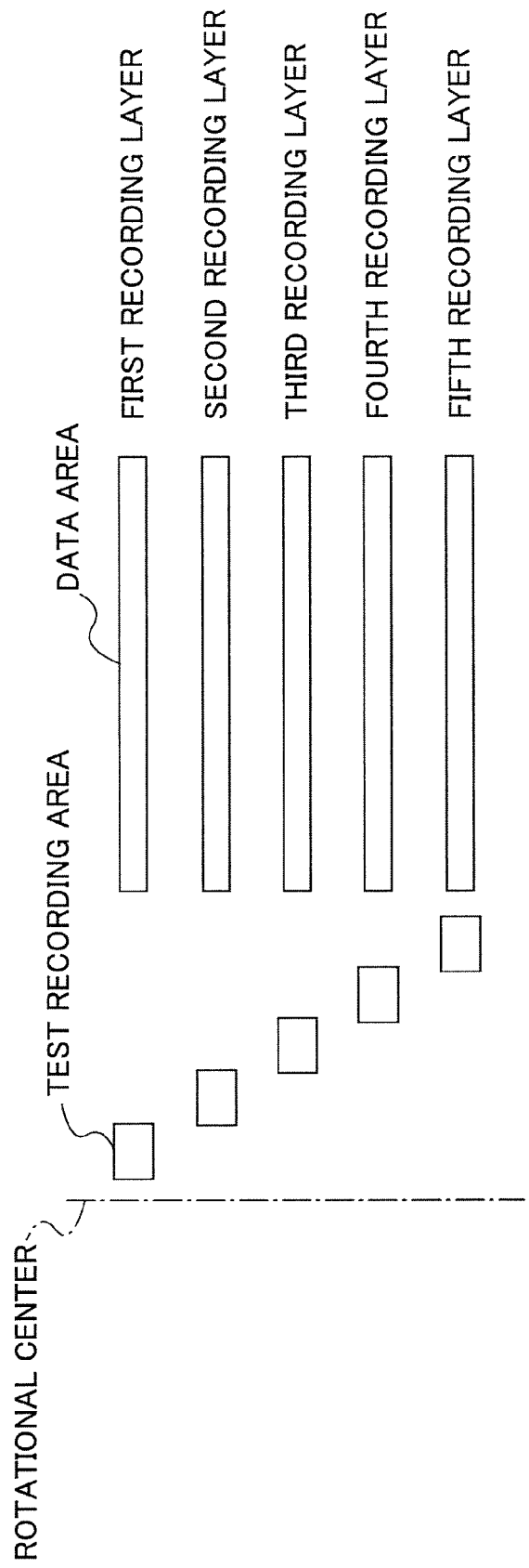
FIG. 15 is a schematic diagram showing a structure in which test recording areas of the first through fifth recording layers are not overlapped in the multilayered recordable optical recording medium shown in FIG. 1.

FIG. 15 is a schematic diagram showing a structure in which test recording areas of the first through fifth recording layers are not overlapped.

In the structure shown in FIG. 15, the size of the test recording area becomes small in each recording layer. In addition, when the number of the recording layers is increased, the test recording areas occupy a large area in the recording medium and the data area becomes small in the recording medium.

According to the present embodiment, since structures shown in FIGS. 6 and 15 are not used, the test recording area can be effectively used and the recording capacity is not lowered in the recording medium.

The information of the decentration amounts can be recorded in the multilayered recordable optical recording medium 100 beforehand. The information of the decentration amounts can be recorded in an arbitrary recording layer. However, in the multilayered recordable optical recording medium 100, since information (data) is sequentially recorded in the recording layers from the farthest recording layer to the nearest recording layer viewed from the laser beam irradiating side in order, it is preferable that the information of the decentration amounts be recorded in the farthest recording layer.

The information of the decentration amounts can be recorded in any position of the multilayered recordable optical recording medium 100.

For example, the information of the decentration amounts can be recorded in an embossed part of the inner circumferential section and/or the outer circumferential section, or a guide groove of the substrate of the recording medium.

The information of the decentration amounts can be recorded in the BCA of the recording medium. The BCA is at the most internal circumferential surface of an optical information recording medium. Information in the BCA can be read without servo control, and the information is, for example, barcode information for identifying the optical information recording medium.

In the BCA, generally, management information such as a serial number of the optical information recording medium is recorded as identification information of the optical information recording medium, and the identification information is used for copyright protection. The BCA is formed when the optical information recording medium is manufactured.

Figure 16:
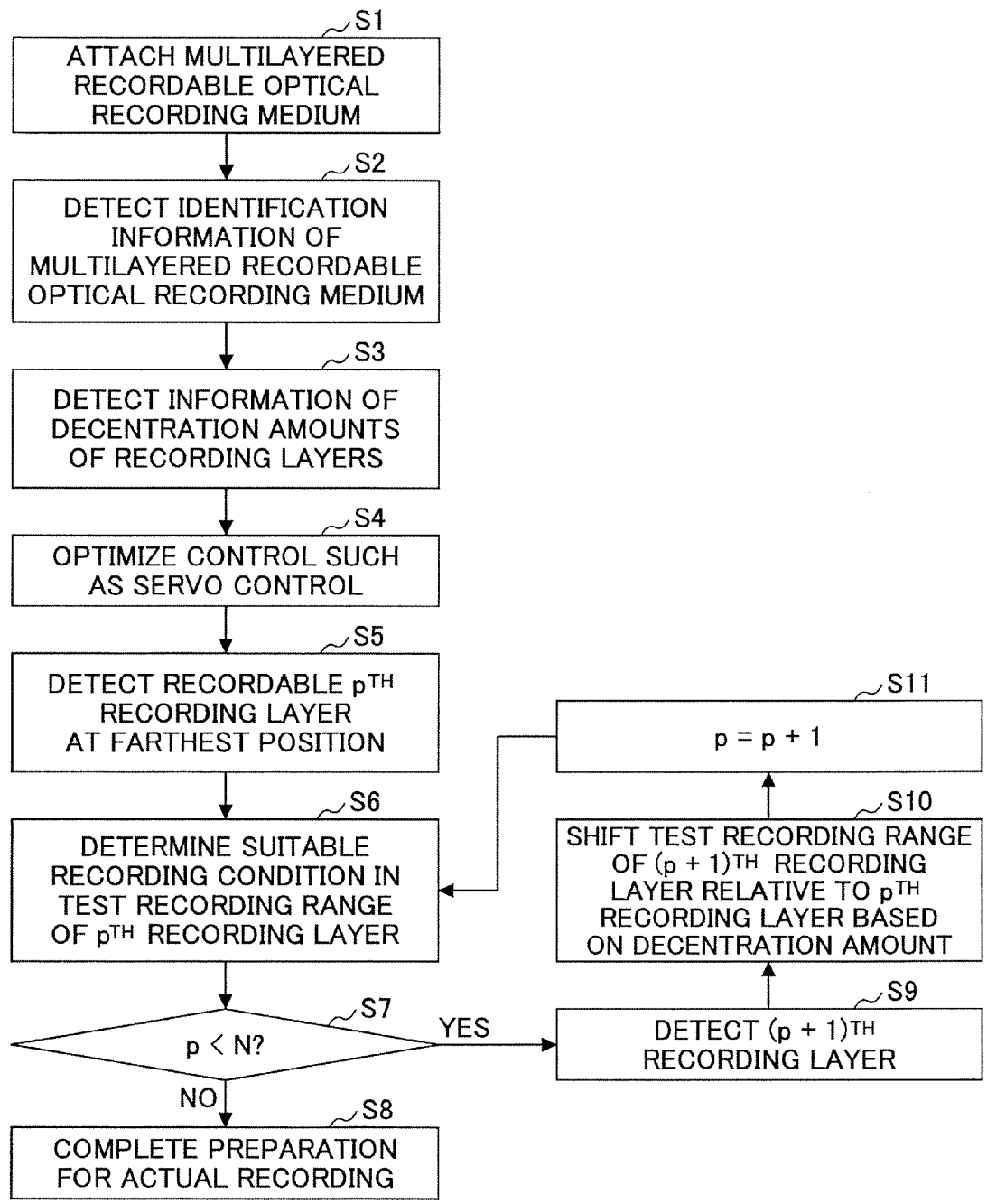
FIG. 16 is a flowchart showing processes according to the first embodiment of the present invention.

FIG. 16 is a flowchart showing processes according to the first embodiment of the present invention. In FIG. 16, processes from attaching a multilayered recordable optical recording medium 100 to a recording and reproducing apparatus to completing preparation for an actual recording in the multilayered recordable optical recording medium 100 are shown.

In FIG. 16, first, a multilayered recordable optical recording medium 100 is attached to a recording and reproducing apparatus (S1). Next, identification information of the multilayered recordable optical recording medium 100 is detected (S2). Then the information of the decentration amounts of the recording layers of the multilayered recordable optical recording medium 100 is detected (S3). In S3, instead of detecting the information of the decentration amounts of the recording layers, the maximum decentration amount "w" can be detected. Next, control such as servo control is optimized (S4).

Next, a $p^{th}$ recordable recording layer at a farthest position is detected (S5) and a suitable recording condition in a test recording range of the $P^{th}$ recording layer is determined (S6). Then it is determined whether p<N (S7). In S7, N is an integer indicating the number of recording layers of the multilayered recordable optical recording medium 100. When p=N (NO in S7); that is, the suitable recording conditions of all the recording layers are determined, the preparation for the actual recording is completed (S8).

When p<N (YES in S7); that is, the suitable recording conditions of all the recording layers are not determined, a $(p+1)^{th}$ layer is detected (S9). Then the test recording range of the $(p+1)^{th}$ layer is shifted relative to the test recording range of the $p^{th}$ recording layer based on the decentration amount (S10), and (p=p+1) is set (S11).

Second Embodiment

Figure 17:
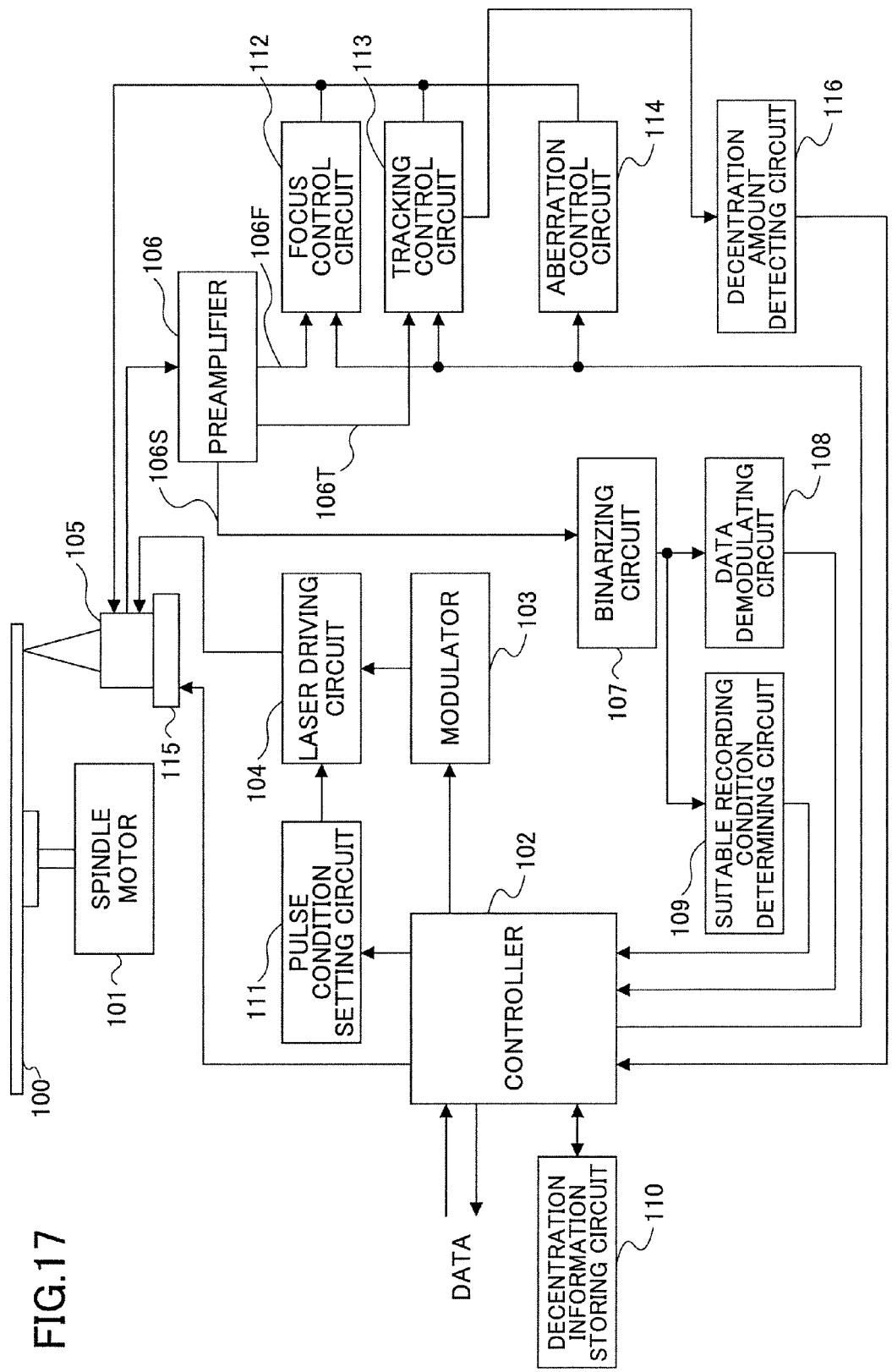
FIG. 17 is a block diagram showing a recording and reproducing apparatus according to a second embodiment of the present invention.

FIG. 17 is a block diagram showing a recording and reproducing apparatus according to a second embodiment of the present invention. In the second embodiment of the present invention, when an element is similar to or the same as that in the first embodiment of the present invention, the same reference number as that in the first embodiment of the present invention is used for the element, and the same description as that in the first embodiment of the present invention is omitted.

As shown in FIG. 17, when the block diagram shown in FIG. 17 is compared with that shown in FIG. 1, a decentration amount detecting circuit 116 is newly added to the second embodiment of the present invention. The decentration amount detecting circuit 116 detects a decentration amount of each recording layer based on a tracking signal from the tracking control circuit 113.

First, the recording and reproducing apparatus initializes the multilayered recordable optical recording medium 100. Specifically, the recording and reproducing apparatus rotates the multilayered recordable optical recording medium 100 by connecting it to the spindle motor 101, and causes the optical head 105 to irradiate a laser beam on the multilayered recordable optical recording medium 100.

In the recording method of the recording and reproducing apparatus, the decentration amounts of all the layers are measured. As described above, the information of the decentration amounts of the recording layers, which has been measured at the time of manufacture of the multilayered recordable optical recording medium 100, can be recorded in the multilayered recordable optical recording medium 100. However, the information of the decentration amounts of the recording layers can be measured when the multilayered recordable optical recording medium 100 is attached to the recording and reproducing apparatus.

Figure 18:
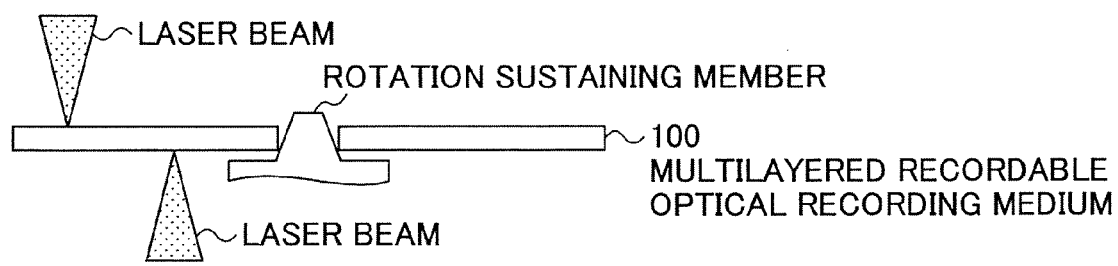
FIG. 18 is a schematic diagram showing a first status in which the multilayered recordable optical recording medium is attached to the recording and reproducing apparatus according to the second embodiment of the present invention.
Figure 19:
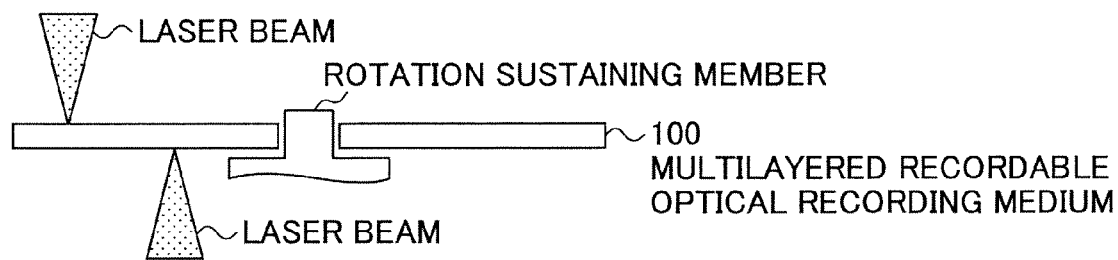
FIG. 19 is a schematic diagram showing a second status in which the multilayered recordable optical recording medium is attached to the recording and reproducing apparatus according to the second embodiment of the present invention.

FIG. 18 is a schematic diagram showing a first status in which the multilayered recordable optical recording medium 100 is attached to the recording and reproducing apparatus. FIG. 19 is a schematic diagram showing a second status in which the multilayered recordable optical recording medium 100 is attached to the recording and reproducing apparatus. In FIGS. 18 and 19, the shapes of rotation sustaining members of the spindle motor 101 (not shown) are different from each other.

When the shapes of the rotation sustaining members of the spindle motor 101 are different from each other due to design differences of the recording and reproducing apparatuses, the decentration amounts of the recording layers may be different from each other when the multilayered recordable optical recording medium 100 is attached to the different recording and reproducing apparatuses.

Therefore, it is preferable that the decentration amounts of the recording layers be measured when the multilayered recordable optical recording medium 100 is attached to the recording and reproducing apparatus.

Figure 20:
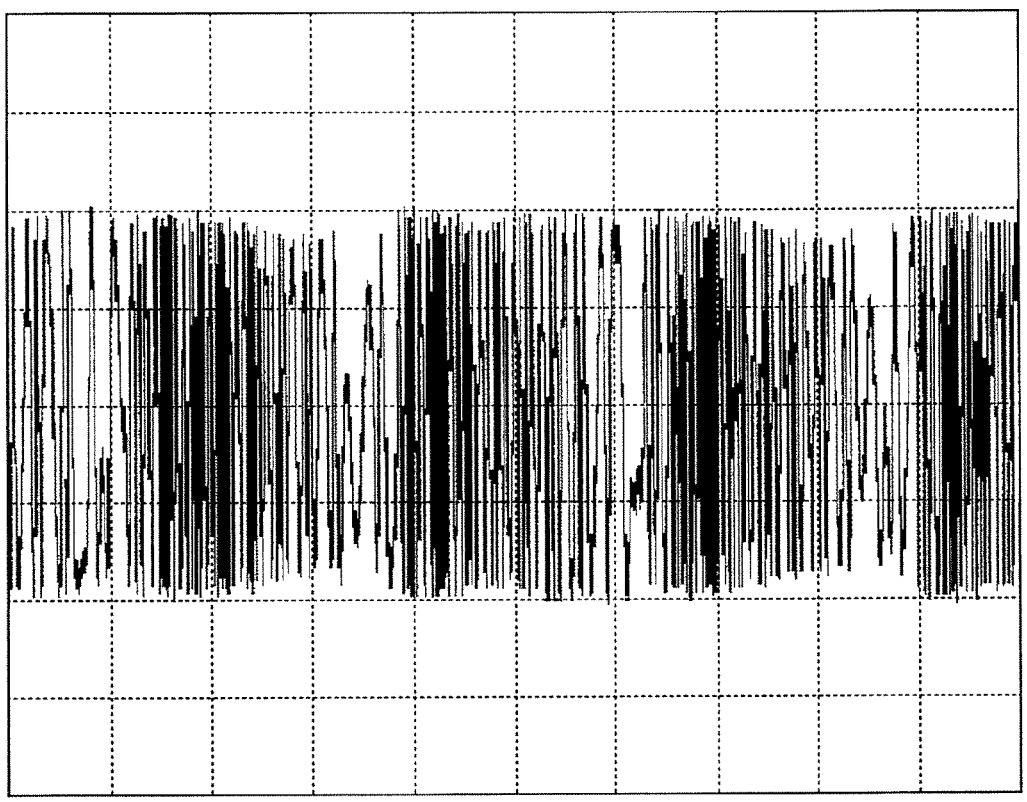
FIG. 20 is a diagram showing a waveform of a push-pull signal when the decentration amount is relatively small according to the second embodiment of the present invention.
Figure 21:
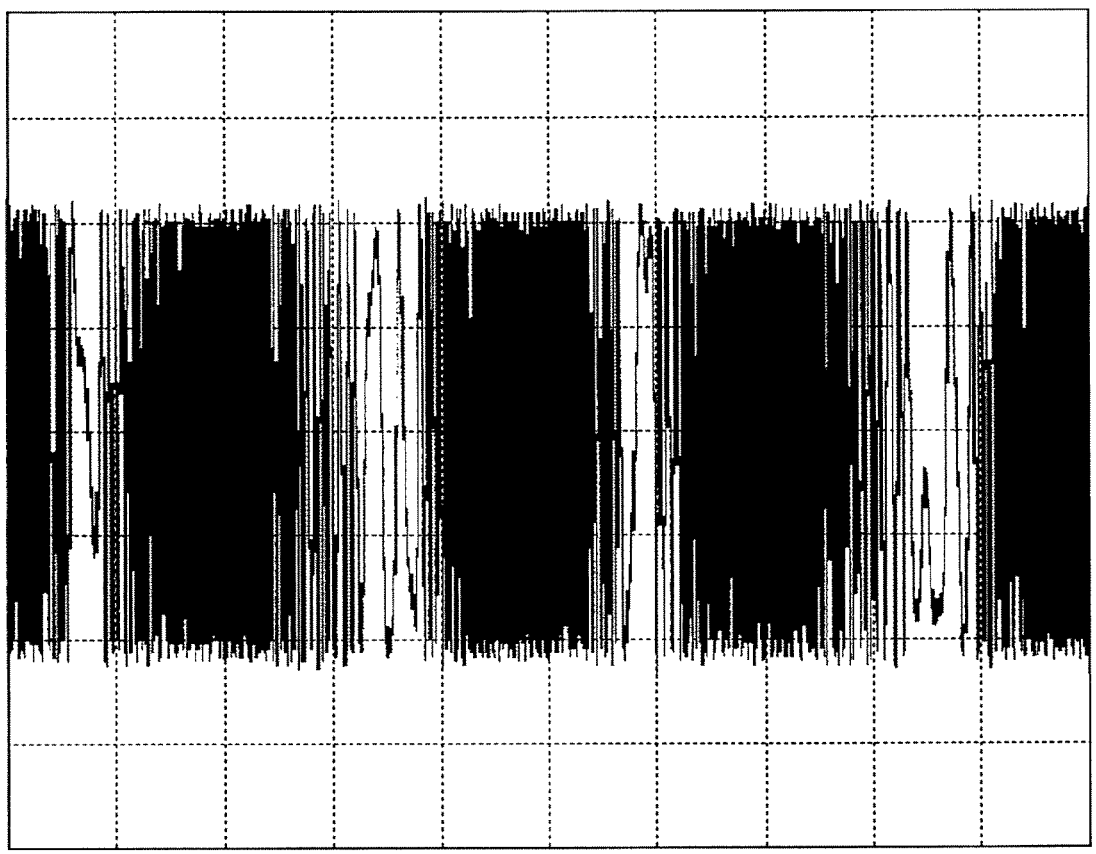
FIG. 21 is a diagram showing a waveform of a push-pull signal when the decentration amount is relatively large according to the second embodiment of the present invention.

FIG. 20 is a diagram showing a waveform of a push-pull signal when the decentration amount is relatively small. FIG. 21 is a diagram showing a waveform of a push-pull signal when the decentration amount is relatively large.

When the push-pull signal is observed, the decentration amount can be estimated. For example, when a laser beam is focused on an arbitrary recording layer and the number of the push-pull signals is measured at the time of tracking OFF, the decentration amount of the recording layer can be estimated. That is, an actual decentration amount can be estimated from the number of the push-pull signals and the track pitch. The decentration amount detecting circuit 116 detects (measures) the number of the push-pull signals and estimates the decentration amount.

Figure 22:
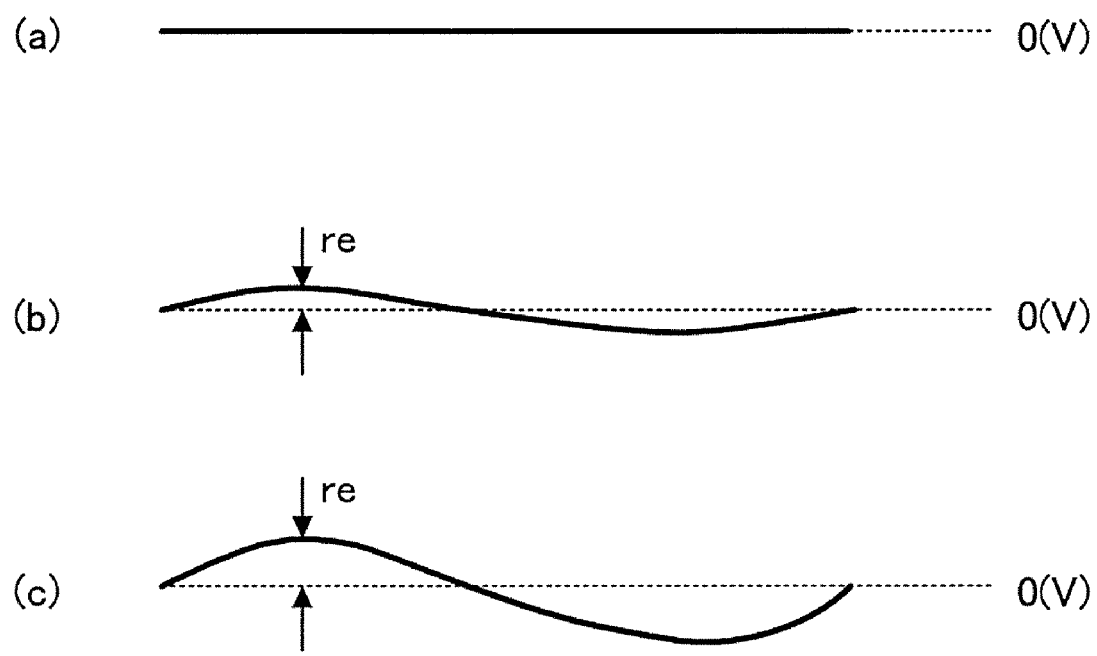
FIG. 22 is a diagram showing a remaining error amount of a push-pull signal shown in FIG. 21.

FIG. 22 is a diagram showing a remaining error amount of a push-pull signal. In FIG. 22, (a) shows a case where the decentration amount is almost nil, (b) shows a case where the decentration amount slightly exists, and (c) shows a case where the decentration amount largely exists. In FIG. 22, "re" shows the remaining amount of the push-pull signal.

For example, a laser beam is focused on an arbitrary recording layer, tracking is applied onto tracks of the recording layer at the time of tracking ON, and the remaining error amount of the push-pull signal is measured; then the decentration amount of the recording layer can be estimated.

The information of the measured decentration amounts of the recording layers is stored in the decentration information storing circuit 110.

In the recording method of the recording and reproducing apparatus, a laser beam is focused on a first recording layer at a farthest position viewed from a laser beam input side, and the laser beam accesses a read-in area, tracks an information track, (or accesses a BCA without tracking), and reads information such as identification information and suitable recording condition information (recommendation value) of the multilayered recordable optical recording medium 100.

When the information such as the identification information and the suitable recording condition information (recommendation value) is read, the information reproduction signal 106S obtained from light reflected from the multilayered recordable optical recording medium 100 at the optical head 105 amplified via the preamplifier 106 is binarized in the binarizing circuit 107, the binarized signal is demodulated at the data demodulating circuit 108, and the demodulated signal is input to the controller 102.

In the above, the order of measuring the decentration amounts and reading the information such as the identification information and the suitable recording condition information can be inverted.

Next, in a test recording area of the first recording layer, test recording for obtaining suitable recording conditions is executed by referring to the suitable recording condition information (recommendation value).

After recording specific data in the test recording area on trial, the recorded data are reproduced, the suitable recording condition determining circuit 109 determines signal quality of the reproduced data, and the suitable recording conditions in the first recording layer are determined.

Next, the laser beam is focused on a second recording layer in front of the first recording layer viewed from the laser beam irradiating side, and suitable recording conditions of the second recording layer are determined by using processes similar to those in the first recording layer.

At this time, a test recording range of the second recording layer is determined based on the decentration amount obtained from the actual measurement.

As described in FIG. 7 of the first embodiment of the present invention, when test recording is executed in each of the recording layers, the test recording ranges of the recording layers are moved in the outer circumferential side of the recording medium. In this case, the test recording range of an $(m+1)^{th}$ recording layer is shifted in the inner circumferential direction of the recording medium relative to an $m^{th}$ recording layer ($1 \leq m \leq (N-1)$).

The shifting amount of the test recording range in each of the recording layers can be determined by the differences of the decentration amounts among the recording layers.

That is, the outer circumferential side end of the test recording range of the $(m+1)^{th}$ recording layer is shifted in the inner circumferential direction relative to the outer circumferential side end of the test recording range of the $m^{th}$ recording layer by an amount more than the difference of the decentration amounts between the $m^{th}$ recording layer and the $(m+1)^{th}$ recording layer.

When the maximum decentration amount is defined as "w", the outer circumferential side end of the test recording range of the $(m+1)^{th}$ recording layer is shifted in the inner circumferential direction relative to the outer circumferential side end of the test recording range of the $m^{th}$ recording layer by an amount more than "w".

The shifting amount of the test recording range can be determined by the difference of the decentration amounts between the $m^{th}$ recording layer and the $(m+1)^{th}$ recording layer. However, in order to easily determine the shifting amount, it is preferable that the shifting amount between the test recording ranges between the $m^{th}$ recording layer and the $(m+1)^{th}$ recording layer be fixed to be an amount more than the maximum decentration amount "w".

When the above processes are repeated for all the recording layers, the initialization of the multilayered recordable optical recording medium 100 in the recording and reproducing apparatus is completed.

When data to be recorded are input to the controller 102, the data are recorded in the corresponding recording layers under the suitable recording conditions determined by the initialization. The number of the initialization times can be only once when the recording and reproducing apparatus is not turned off or when the multilayered recordable optical recording medium 100 is detached from the recording and reproducing apparatus.

Figure 23:
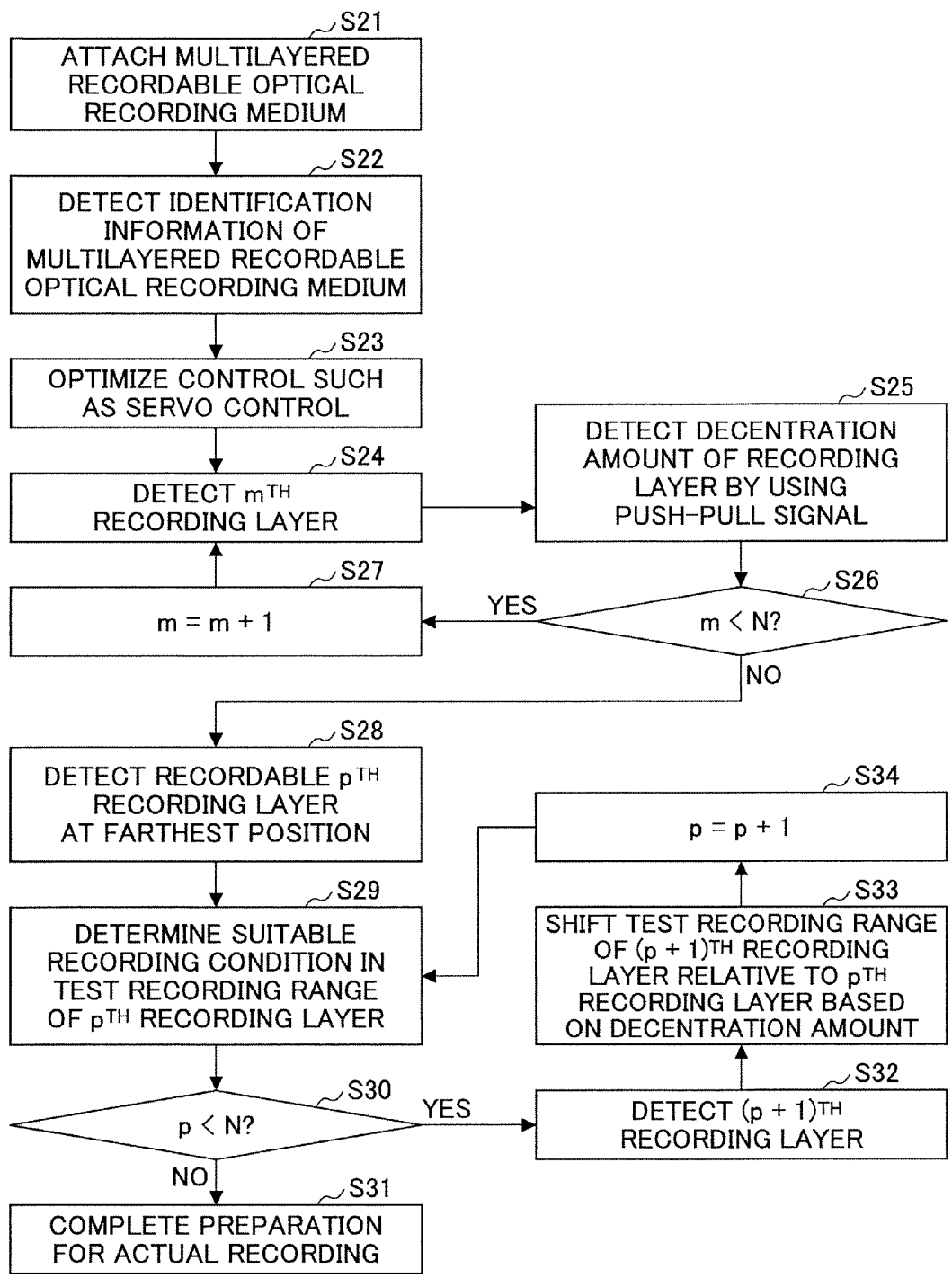
FIG. 23 is a flowchart showing processes according to the second embodiment of the present invention.

FIG. 23 is a flowchart showing processes according to the second embodiment of the present invention. In FIG. 23, processes from attaching a multilayered recordable optical recording medium 100 to a recording and reproducing apparatus to completing preparation for an actual recording in the multilayered recordable optical recording medium 100 are shown. In FIG. 23, the push-pull signal is used.

In FIG. 23, first, a multilayered recordable optical recording medium 100 is attached to a recording and reproducing apparatus (S21). Next, identification information of the multilayered recordable optical recording medium 100 is detected (S22). Then control such as servo control is optimized (S23).

Next, an $m^{th}$ recording layer is detected (S24). In S24, the initial value of "m" is 1. Then a decentration amount of the $m^{th}$ recording layer is detected by using a push-pull signal (S25). Next, it is determined whether m<N (S26). In S26, N is an integer indicating the number of recording layers of the multilayered recordable optical recording medium 100. When m<N (YES in S26); that is, the push-pull signals of all the recording layers are not detected, m is incremented (m=m+1) (S27). That is, in S24, an $(m+1)^{th}$ layer next to the $m^{th}$ layer is detected.

When m=N (NO in S26; that is, the push-pull signals of all the recording layers are detected, a $p^{th}$ recordable recording layer at a farthest position is detected (S28). Then suitable recording conditions in a test recording range of the $p^{th}$ recording layer are determined (S29).

Next, it is determined whether p<N (S30). When p=N (NO in S30); that is, the suitable recording conditions of all the recording layers are determined, the preparation for the actual recording is completed (S31).

When p<N (YES in S30); that is, the suitable recording conditions of all the recording layers are not determined, a $(p+1)^{th}$ layer is detected (S32). Then the test recording range of the $(p+1)^{th}$ layer is shifted relative to the test recording range of the $p^{th}$ recording layer based on the decentration amount (S33), and p is incremented (p=p+1) (S34). Then in S29, suitable recording conditions in a test recording range of the $(p+1)^{th}$ recording layer are determined (S29).

Third Embodiment

Figure 24:
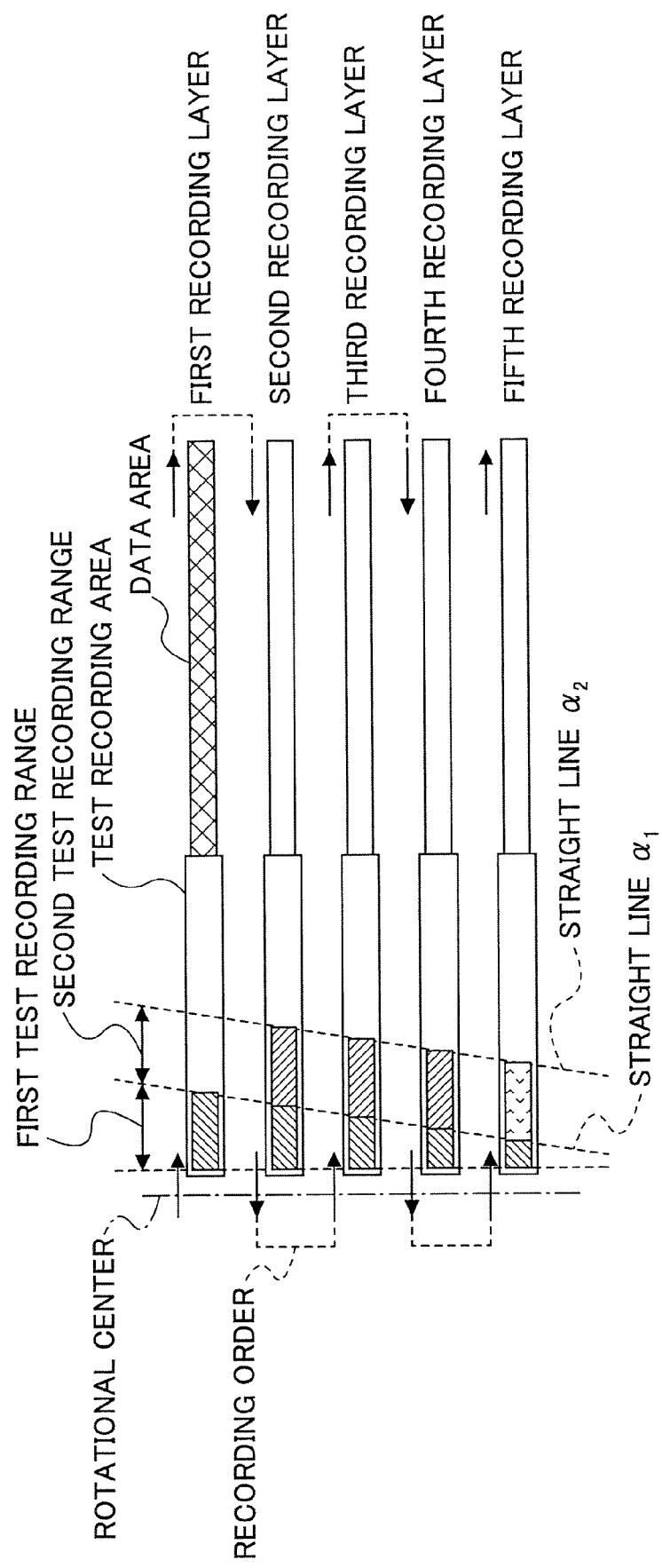
FIG. 24 is a schematic diagram showing a first case of test recording according to a third embodiment of the present invention.

FIG. 24 is a schematic diagram showing a first case of test recording according to a third embodiment of the present invention.

In the first case of the third embodiment of the present invention, data have been recorded in all parts of the data area of the first recording layer after the first test recording; therefore, second test recording is executed from the second recording layer.

In the first and second embodiments of the present invention, when a multilayered recordable optical recording medium 100 is attached to a recording and reproducing apparatus, test recording is executed in all the recording layers of the multilayered recordable optical recording medium 100, and suitable recording conditions are determined in each of all the recording layers.

However, in the third embodiment of the present invention, when actual recording is requested, the OPC process may be applied only to a recording layer (farthest recordable recording layer) where the actual recording is to be executed.

That is, in a case where actual recording is requested, when it is determined that the actual recording can be executed by using recording layers from a recordable farthest $p^{th}$ recording layer ($1 \leq p \leq N$) to a closest recordable $q^{th}$ recording layer ($p \leq q \leq N$) by considering the size of data to be recorded, the test recording is executed only in the minimum necessary recording layers.

As shown in FIG. 24, when a multilayered recordable optical recording medium 100 is attached to a recording and reproducing apparatus in which medium 100 data have been recorded in all parts of the data area of the first recording layer, the test recording is executed starting on a second recording layer where the actual recording can be executed.

First, a multilayered recordable optical recording medium 100 is attached to a recording and reproducing apparatus and first test recording is sequentially executed in first test recording ranges of the first through fifth recording layers. With this, as shown in FIG. 24, data are recorded in all parts of the data area of the first recording layer based on the result of the first test recording. Then the multilayered recordable optical recording medium 100 is detached from the recording and reproducing apparatus.

Next, this multilayered recordable optical recording medium 100 is attached to the recording and reproducing apparatus again, and the recording and reproducing apparatus detects that the data have been recorded in all parts of the data area of the first recording layer. Therefore, second test recording is sequentially executed in the second recording layer through the fifth recording layer in order.

In FIG. 24, a pattern in the second test recording range of the fifth recording layer is different from that in the second test recording ranges of the second through fourth recording layers. This pattern indicates that the second test recording is not executed in the second test recording range of the fifth recording layer. That is, when the $p^{th}$ recording layer is the second recording layer and the $q^{th}$ recording layer is the fourth recording layer, the second test recording is not executed in the fifth recording layer.

Figure 25:
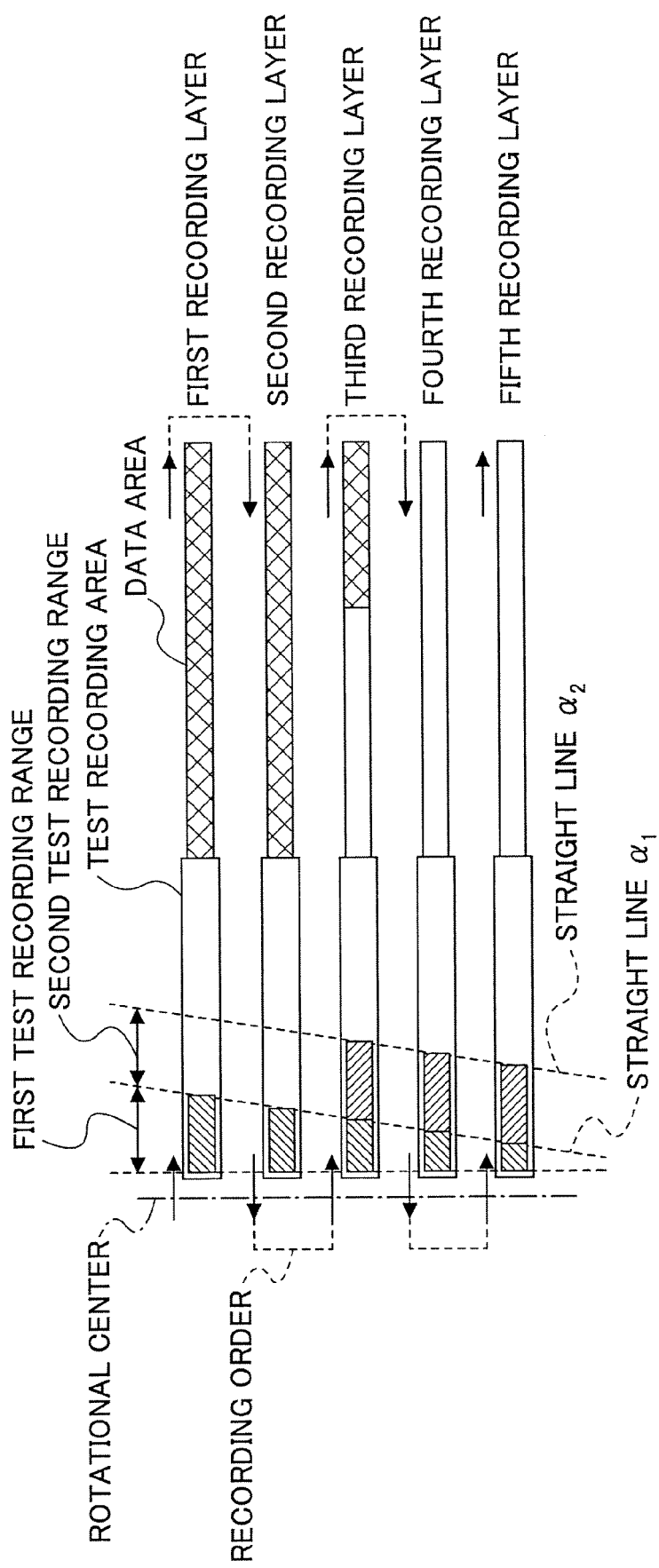
FIG. 25 is a schematic diagram showing a second case of test recording according to the third embodiment of the present invention.

FIG. 25 is a schematic diagram showing a second case of test recording according to the third embodiment of the present invention.

In the second case of the third embodiment of the present invention, data have been recorded in all parts of the data areas of the first and second recording layers and a part of the data area of the third recording layer after the first test recording; therefore, second test recording is executed from a part of the third recording layer.

When this multilayered recordable optical recording medium 100 is attached to the recording and reproducing apparatus, and the recording and reproducing apparatus detects that the data have been recorded in all parts of the data areas of the first and second recording layers and a part of the data area of the third recording layers, the second test recording is sequentially executed in the third recording layer through the fifth recording layer in order.

Fourth Embodiment

Figure 26:
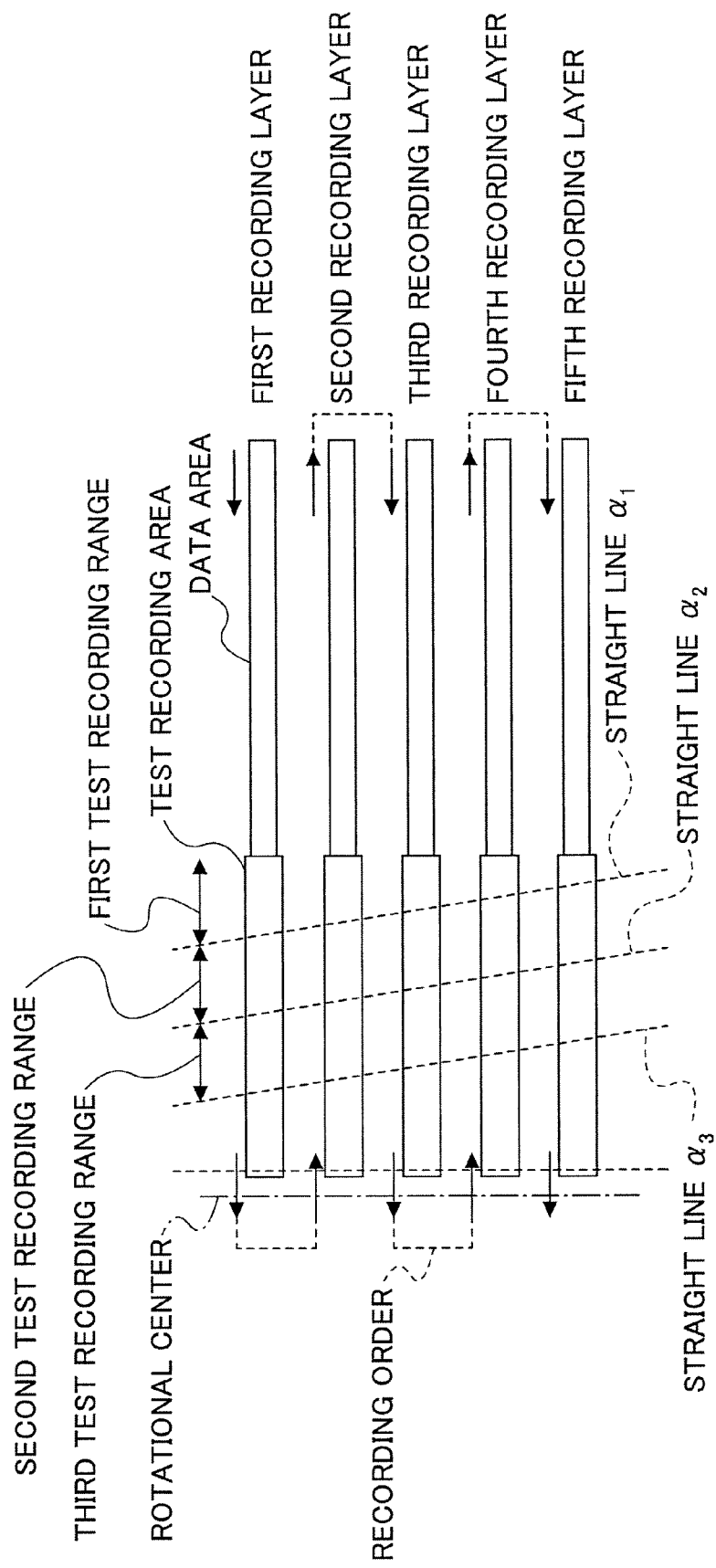
FIG. 26 is a schematic diagram showing test recording according to a fourth embodiment of the present invention.

FIG. 26 is a schematic diagram showing test recording according to a fourth embodiment of the present invention.

In a fourth embodiment of the present invention, the test recording range in the test recording area of each of the recording layers is allocated from the outer circumferential side of the recording medium.

In the first through third embodiments of the present invention, after the first test recording is executed in each of the recording layers, in the second test recording, the test recording range of each of the recording layers is shifted in the outer circumferential direction of the recording medium; that is, when the test recording is executed in each of the recording layers, the test recording ranges of the recording layers are moved in the outer circumferential side of the recording medium. Further, the test recording range of an $(m+1)^{th}$ recording layer is shifted in the inner circumferential direction of the recording medium relative to an $m^{th}$ recording layer ($1 \leq m \leq (N-1)$).

In the fourth embodiment of the present invention, after the first test recording is executed in each of the recording layers, in the second test recording, the test recording range of each of the recording layers is shifted in the inner circumferential direction of the recording medium; that is, when the test recording is executed in each of the recording layers, the test recording ranges of the recording layers are moved toward in the inner circumferential side of the recording medium.

Further, the test recording range of an $(m+1)^{th}$ recording layer is shifted in the outer circumferential direction of the recording medium relative to an $m^{th}$ recording layer ($1 \leq m \leq (N-1)$).

Figure 27:
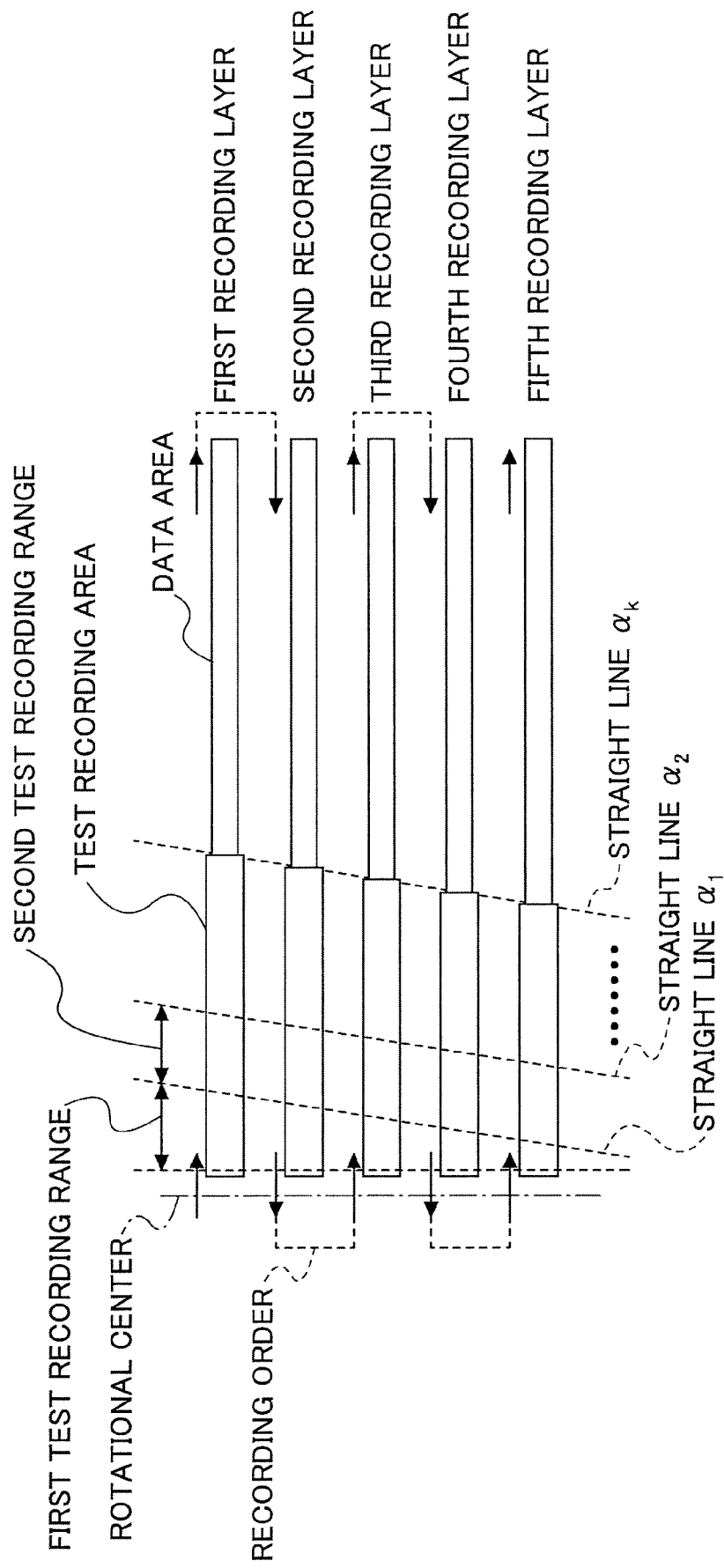
FIG. 27 is a schematic diagram showing test recording ranges in a second case according to the first embodiment of the present invention.

FIG. 27 is a schematic diagram showing test recording ranges in a second case according to the first embodiment of the present invention.

In the first through third embodiments of the present invention, as described above, on and after the second test recording, a test recording range of a second recording layer in front of a first recording layer does not overlap a test recording range of the first recording layer. Therefore, as shown in FIG. 27, when boundary lines among the test recording ranges of the recording layers are connected, straight lines $\alpha_k$ are shown.

As shown in FIGS. 7 and 27, the sizes of the first test recording ranges are different among the first through fifth recording layers. In FIG. 7, in the first recording layer, the sizes of the first through third test recording ranges are almost the same normal size. However, the sizes of the first test recording ranges of the recording layers on and after the second recording layers gradually become small. Naturally, the sizes of the last test recording ranges of the recording layers on and after the second recording layers gradually become large.

However, when the size of the test recording range is small, the amount of data which is used to obtain the suitable recording conditions by correction becomes small, and correction accuracy is lowered. In order to solve the above problem, the following method can be used. That is, the size of the first test recording range of the fifth recording layer is determined to be the normal size, and the sizes of the first test recording ranges of the recording layers on and after the fourth recording layer in the upward direction are made to be gradually large. However, in this case, unnecessary large sizes are allocated to the first through fourth recording layers in the first test recording range.

In the embodiments of the present invention, the test recording ranges are allocated to the recording layers from the center side of the recording medium, and the sizes of the first test recording ranges of the first through fifth recording layers are gradually changed. In this case, the sizes can be gradually increased or decreased by a predetermined amount.

The predetermined amount is slightly larger than the maximum decentration amount "w" which is generated in manufacturing the recording medium. The slightly larger amount indicates the size of approximately one track in the recording medium. When the predetermined amount is determined to be the maximum decentration amount "w", in a worst case, there is a risk that a test recording range of a recording layer at this time overlaps another test recording range of another recording layer in front of the recording layer at the previous time.

In FIG. 27, when the test recording range of a recording layer is small, the data area of the recording layer becomes large, and the recording capacity becomes large in the recording layer.

In FIG. 27, the first test recording is executed from the center side of the recording medium, and the last test recording is executed in the last test recording ranges of the recording layers. However, in the first test recording, the sizes of the test recording ranges are different from each other in the first through fifth recording layers.

Figure 28:
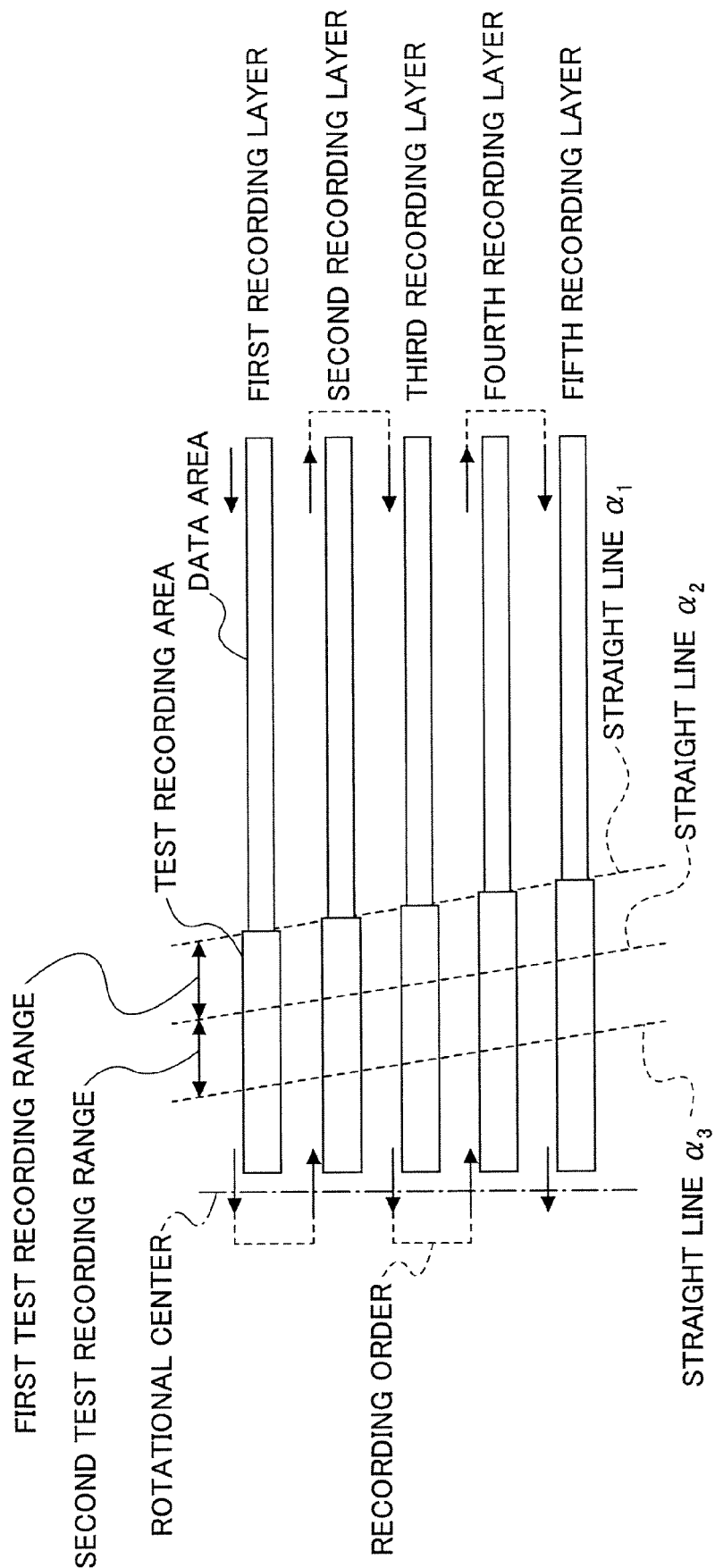
FIG. 28 is a schematic diagram showing test recording ranges in a second case according to the fourth embodiment of the present invention.

FIG. 28 is a schematic diagram showing test recording ranges in a second case according to the fourth embodiment of the present invention.

In FIG. 28, the test recording is executed in the center side direction from the farthest side of the recording medium. Therefore, the first test recording regions of the first through fifth recording layers can be fully used. However, the sizes of the last test recording ranges of the first through fifth recording layers are different from each other, and the size of the last test recording range of the first recording layer is smallest. However, as described above, data are sequentially recorded in the data areas of the first through fifth recording layers in order. Therefore, the possibility is low in that the last test recording range of the first recording layer will be used, and regarding the second recording layer, the possibility similar to that of the first recording layer exists.

In the embodiments of the present invention, a test recording direction is different from a using direction of a test recording range. The test recording direction indicates a direction in which an $(m+1)^{th}$ test recording range is added to an $m^{th}$ test recording range. The using direction of the test recording range indicates a laser beam moving direction in an $m^{th}$ test recording range in an $n^{th}$ recording layer.

The test recording area indicates all parts of the first through last test recording ranges of the recording layer. That is, the test recording range is a part of the test recording area and is used to obtain suitable recording conditions for actual recording.

For example, as shown in FIG. 9, in each recording layer, the second test recording range is in the outer circumference direction relative to the first recording range. That is, after executing test recording in a test recording range, the next test recording range is moved in the outer circumferential direction (test recording direction).

However, the recording direction in the test recording range (the using direction of the test recording range) can be determined to be an arbitrary direction in each recording layer. As shown in FIG. 14, the test recording range (the hatched part) is sequentially moved in the outer circumferential direction in each recording layer; however, the test recording direction in the test recording range (the using direction of the test recording range) can be an arbitrary direction.

In the embodiments of the present invention, as an example, the number of the recording layers is five; however, the number of the recording layers can be an arbitrary number.

In the embodiments of the present invention, in $n^{th}$ test recording, the using direction of the test recording range of the $m^{th}$ recording layer is different from the using direction of the test recording range of the $(m+1)^{th}$ recording layer ($1 \leq m \leq (N-1)$. That is, as shown in arrows of FIGS. 3 through 14, and 24 through 28, the laser beam irradiating sides are different between the test recording ranges of the $m^{th}$ and $(m+1)^{th}$ recording layers.

In addition, in FIGS. 3 through 14, and 24 through 28, the data recording direction in the data area is shown by arrows; however, the data recording direction can be determined to be an arbitrary direction. That is, the data recording direction can be the same direction as the using direction of the test recording range or can be different from the using direction of the test recording range.

In addition, for example, as shown in FIG. 14, the hatched parts are the test recording ranges in each of the test recording areas. The test recording ranges can be used as ranges where the test recording is executed, and it is not always necessary that all of the test recording ranges be used in the test recording.

As described above, according to the embodiments of the present invention, when test recording is executed, information showing a recorded status of each recording layer is not needed, and information of suitable recording conditions of each recording layer corresponding to a recorded status of another recording layer is not needed. In addition, a correction table for obtaining the suitable recording conditions, and storing and managing the recorded statuses of the other recording layers are not needed; therefore, the workload in the recording and reproducing apparatus can be lowered, and the recording capacity of the recording and reproducing apparatus can be effectively used. Further, the time for obtaining the suitable recording conditions can be short and the suitable recording conditions can be accurately obtained. Moreover, the test recording range can be effectively used with high accuracy of the test recording. Consequently, a recording method in a multilayered recordable optical recording medium can be realized with high reliability, a recording and reproducing apparatus using the recording method can be realized, and the multilayered recordable optical recording medium for the recording and reproducing apparatus can be realized.

Further, the present invention is not limited to the specifically disclosed embodiments, and variations and modifications may be made without departing from the scope of the present invention.

The present invention is based on Japanese Priority Patent Application No. 2007-240242, filed on Sep. 14, 2007, with the Japanese Patent Office, the entire contents of which are hereby incorporated herein by reference.

What is claimed is:

1. A method of recording data in a multilayered recordable optical recording medium having N (N is an integer of 2 or more) recording layers each of which layers includes a test recording area where test recording is executed for obtaining an optimum recording condition for actual recording, and which method includes a data recording step in which data are sequentially recorded in the recording layers from a first recording layer at a farthest position to an $N^{th}$ recording layer at a nearest position viewed from a recording and reproducing laser beam inputting direction in order, comprising:

a test recording executing step which sequentially executes test recording in recordable recording layers having unrecorded parts from a $p^{th}$ recording layer ($1 \leq p \leq N$) at a farthest position in the recordable recording layers to an arbitrary $q^{th}$ recording layer ($p \leq q \leq N$) in the recordable recording layers at the farthest position to the nearest position viewed from the recording and reproducing laser beam inputting direction;

a test recording range using step which sequentially uses a plurality of test recording ranges formed by dividing the test recording area in a radius direction from one end to the other end of the recording medium in each of the recording layers (hereinafter this direction is referred to as a test recording direction); and a shifting step which shifts the test recording range of an $(m+1)^{th}$ recording layer by a predetermined shifting distance relative to the test recording range of an $m^{th}$ recording layer in a direction inverse to the test recording direction.

2. The method of recording data in the multilayered recordable optical recording medium as claimed in claim 1, wherein:

the shifting step shifts the test recording range of the $(m+1)^{th}$ recording layer by the predetermined shifting distance relative to the test recording range of the $m^{th}$ recording layer in a direction equal to the test recording direction.

3. The method of recording data in the multilayered recordable optical recording medium as claimed in claim 1, wherein:

when the test recording is executed in the $m^{th}$ recording layer, the test recording ranges of the $(m+1)^{th}$ recording layer through the $N^{th}$ recording layer at a position where the test recording is executed in the radius direction of the recording medium are unrecorded statuses.

4. The method of recording data in the multilayered recordable optical recording medium as claimed in claim 1, wherein:

the predetermined shifting distance is greater than a difference of decentration amounts between the $m^{th}$ recording layer and the $(m+1)^{th}$ recording layer.

5. The method of recording data in the multilayered recordable optical recording medium as claimed in claim 4, wherein:

information of the decentration amounts has been recorded in an arbitrary recording layer, or in a BCA (burst cutting area) of the recording medium beforehand.

6. The method of recording data in the multilayered recordable optical recording medium as claimed in claim 4, further comprising:

a decentration information detecting step which detects information of the decentration amounts of the $m^{th}$ recording layer and the $(m+1)^{th}$ recording layer by obtaining push-pull signals of the $m^{th}$ recording layer and the $(m+1)^{th}$ recording layer before executing the test recording.

7. The method of recording data in the multilayered recordable optical recording medium as claimed in claim 6, wherein:

the decentration information detecting step measures the number of the push-pull signals at the tracking OFF time, or measures remaining error amounts of the push-pull signals at the tracking ON time.

8. The method of recording data in the multilayered recordable optical recording medium as claimed in claim 1, wherein:

when a maximum decentration amount in the N recording layers of the recording medium is defined as "w", the predetermined shifting distance is greater than the "w".

9. The method of recording data in the multilayered recordable optical recording medium as claimed in claim 8, wherein:

information of the decentration amounts has been recorded in an arbitrary recording layer, or in a BCA of the recording medium beforehand.

10. The method of recording data in the multilayered recordable optical recording medium as claimed in claim 8, further comprising:
a decentration information detecting step which detects the maximum decentration amount "w" by obtaining push-pull signals of all the recording layers before executing the test recording.

11. A recording and reproducing apparatus for recording data in a multilayered recordable optical recording medium having N (N is an integer of 2 or more) recording layers each of which layers includes a test recording area where test recording is executed for obtaining an optimum recording condition for actual recording, and which sequentially records the data in the recording layers from a first recording layer at a farthest position to an $N^{th}$ recording layer at a nearest position viewed from a recording and reproducing laser beam inputting direction in order, comprising:
a test recording executing unit which sequentially executes test recording in recordable recording layers having unrecorded parts from a $p^{th}$ recording layer ($1 \leq p \leq N$) at a farthest position in the recordable recording layers to an arbitrary $q^{th}$ recording layer ($p \leq q \leq N$) in the recordable recording layers at the farthest position to the nearest position viewed from the recording and reproducing laser beam inputting direction;
a test recording range using unit which sequentially uses a plurality of test recording ranges formed by dividing the test recording area in a radius direction from one end to the other end of the recording medium in each of the recording layers (hereinafter this direction is referred to as a test recording direction); and
a shifting unit which shifts the test recording range of an $(m+1)^{th}$ recording layer by a predetermined shifting distance relative to the test recording range of an $m^{th}$ recording layer in a direction inverse to the test recording direction.

12. The recording and reproducing apparatus as claimed in claim 11, wherein:
the shifting unit shifts the test recording range of the $(m+1)^{th}$ recording layer by the predetermined shifting distance relative to the test recording range of the $m^{th}$ recording layer in a direction equal to the test recording direction.

13. The recording and reproducing apparatus as claimed in claim 11, wherein:
when the test recording is executed in the $m^{th}$ recording layer, the test recording ranges of the $(m+1)^{th}$ recording layer through the $N^{th}$ recording layer at a position where the test recording is executed in the radius direction of the recording medium are unrecorded statuses.

14. The recording and reproducing apparatus as claimed in claim 11, wherein:
the predetermined shifting distance is greater than a difference of decentration amounts between the $m^{th}$ recording layer and the $(m+1)^{th}$ recording layer.

15. The recording and reproducing apparatus as claimed in claim 14, wherein:
information of the decentration amounts has been recorded in an arbitrary recording layer, or in a BCA of the recording medium beforehand.

16. The recording and reproducing apparatus as claimed in claim 14, further comprising:
a decentration information detecting unit which detects information of the decentration amounts of the $m^{th}$ recording layer and the $(m+1)^{th}$ recording layer by obtaining push-pull signals of the $m^{th}$ recording layer and the $(m+1)^{th}$ recording layer before executing the test recording.

17. The recording and reproducing apparatus as claimed in claim 11, wherein:
when a maximum decentration amount in the N recording layers of the recording medium is defined as "w", the predetermined shifting distance is greater than the "w".

18. The recording and reproducing apparatus as claimed in claim 17, wherein:
information of the decentration amounts has been recorded in an arbitrary recording layer, or in a BCA of the recording medium beforehand.

* * * * *